United States Patent
Butt et al.

(10) Patent No.: US 12,071,529 B2
(45) Date of Patent: Aug. 27, 2024

(54) NANOCOMPOSITE CONTACT LENSES VIA CHEMICAL VOLUMETRIC MODULATION OF HYDROGELS

(71) Applicant: Khalifa University of Science and Technology, Abu Dhabi (AE)

(72) Inventors: Haider Butt, Abu Dhabi (AE); Ahmed E. Salih, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 0 days.

(21) Appl. No.: 18/086,741

(22) Filed: Dec. 22, 2022

(65) Prior Publication Data
US 2024/0209179 A1    Jun. 27, 2024

(51) Int. Cl.
*C08K 3/08* (2006.01)
*B29D 11/00* (2006.01)
*G02B 1/04* (2006.01)

(52) U.S. Cl.
CPC .......... *C08K 3/08* (2013.01); *B29D 11/00125* (2013.01); *G02B 1/043* (2013.01); *C08K 2003/0806* (2013.01); *C08K 2201/003* (2013.01); *C08K 2201/011* (2013.01); *C08K 2201/013* (2013.01)

(58) Field of Classification Search
CPC .............. C08K 3/08; C08K 2003/0806; C08K 2003/0831; C08K 2201/003; C08K 2201/011; C08K 2201/013; G02B 1/043; B29D 11/00125
See application file for complete search history.

(56) References Cited

U.S. PATENT DOCUMENTS

2013/0235335 A1    9/2013    Forrest et al.

OTHER PUBLICATIONS

Ahmed E. Salih, Mohamed Elsherif, Fahad Alam, Bader Alqattan, Ali K. Yetisen, and Haider Butt, Syntheses of Gold and Silver Nanocomposite Contact Lenses via Chemical Volumetric Modulation of Hydrogels, ACS Biomater. Sci. Eng. 2022, 8, 2111-2120 (Year: 2022).*
Varsha Thomas, Murali Mohan Yallapu, B. Sreedhar, S. K. Bajpai, Breathing-In/Breathing-Out Approach to Preparing Nanosilver-Loaded Hydrogels: Highly Efficient Antibacterial Nanocomposites, Journal of Applied Polymer Science, vol. 111, 934-944 (2009) (Year: 2009).*
Zhen Liu, Anuj Chauhan, Gold nanoparticles-loaded contact lenses for laser protection and Meibomian Gland Dysfunction (MGD) dry eye treatment, Colloids and Surfaces A: Physicochemical and Engineering Aspects 635 (2022) 128053 (Year: 2022).*
Bajpai, S. K., et al., "In Situ Formation of Silver Nanoparticles in Poly(N-Isopropyl Acrylamide) Hydrogel for Antibacterial Applications", Designed Monomers and Polymers 14 (2011) 383-394.

(Continued)

*Primary Examiner* — Bijan Ahvazi
(74) *Attorney, Agent, or Firm* — Billion & Armitage

(57) ABSTRACT

A method of incorporating nanoparticles into a contact lens includes contacting the contact lens with a solvent sufficient to remove liquid from the contact lens and contacting the contact lens with colloidal nanoparticles sufficient to transfer nanoparticles from the colloidal nanoparticles to the contact lens.

15 Claims, 26 Drawing Sheets

(56) References Cited

OTHER PUBLICATIONS

Pardo-Yissar, Vered, et al., "Gold Nanoparticle/Hydrogel Composites with Solvent-Switchable Electronic Properties", Adv. Mater. 2001, 13, No. 17, Sep. 3, 1320-1323.

Thomas, Varsha, et al., "Breathing-In/Breathing-Out Approach to Preparing Nanosilver-Loaded Hydrogels: Highly Efficient Antibacterial Nanocomposites", Journal of Applied Polymer Science, vol. 111, 934-944 (2009).

Alam, et al., "3D Printed Contact Lenses", ACS Biomaterials Science & Engineering, Jan. 19, 2021, 794-803.

Alam, et al., "Prospects for Additive Manufacturing in Contact Lens Devices", Advanced Engineering Materials, 2020, 2000941. 13 pages., Sep. 7, 2020.

Alqattan, et al., "Direct Laser Writing of Nanophotonic Structures on Contact Lenses", ACS Nano 2018, 12, 5130-5140, Jan. 10, 2023.

Amendola, et al., "Surface plasmon resonance in gold nanoparticles: a review", Vincenzo Amendola et al 2017 J. Phys.: Condens. Matter 29 203002, Apr. 20, 2017.

Badawy, et al., "Contact Lenses for Color Blindness", Adv. Healthcare Mater. 2018, 7, 1800152, 1-7.

Carlson, "A comparison of blue-light transmissions through blue-control lenses", African Vision and Eye Health. 2019;78(1), a497; https://doi.org/10.4102/aveh.v78i1.497, Oct. 30, 2019.

Chwalik-Pilszyk, et al., "Influence of Selected Ophthalmic Fluids on theWettability and Hydration of Hydrogel and Silicone Hydrogel Contact Lenses—In Vitro Study", Materials 2022, 15, 930. https://doi.org/10.3390/ma15030930, Jan. 25, 2022.

Cuthbertson, et al., "Blue light-filtering intraocular lenses: Review of potential benefits and side effects", J Cataract Refract Surg 2009; 35:1281-1297, 2009 ASCRS and ESCRS.

Dunn, et al., "Wearables and the medical revolution", Personalized Medicine (2018) 15(5), 429-448, Sep. 27, 2018.

Elsherif, et al., "Contact Lenses for Color Vision Deficiency", Adv. Mater. Technol. 2021, 6, 2000797, 1-9.

Elsherif, et al., "Wearable Contact Lens Biosensors for Continuous Glucose Monitoring Using Smartphones", ACS Nano 2018, 12, 5452-5462, May 11, 2018.

Farandos, et al., "Contact Lens Sensors in Ocular Diagnostics", Adv. Healthcare Mater. 2014, DOI: 10.1002/adhm.201400504, 1-19.

Franci, et al., "Silver Nanoparticles as Potential Antibacterial Agents", Molecules 2015, 20, 8856-8874; doi:10.3390/molecules20058856, May 18, 2015.

Fu, et al., "Some basic aspects of polymer nanocomposites: A critical review", Nano Materials Science 1 (2019) 2-30, Mar. 21, 2019.

Garcia, "Corrigendum: Surface plasmons in metallic nanoparticles: fundamentals and applications", 2011 Journal of Physics D: Applied Physics, 45 (2012) 389501 (1pp), Sep. 4, 2012.

Guo, et al., "Highly Dispersed Metal Nanoparticles in Porous Anodic Alumina Films Prepared by a Breathing Process of Polyacrylamide Hydrogel", Chem. Mater., vol. 15, No. 22, 2003, 4332-4336.

Huang, et al., "Gold nanoparticles: Optical properties and implementations in cancer diagnosis and photothermal therapy", Journal of Advanced Research (2010) 1, 13-28, 13-28.

Karimi, et al., "Surface Plasmon Resonance in Small Gold Nanoparticles: Introducing a Size-Dependent Plasma Frequency for Nanoparticles in Quantum Regime", Plasmonics (2019) 14:851-860, Oct. 30, 2018.

Kharaghani, et al., "Development of antibacterial contact lenses containing metallic nanoparticles", Polymer Testing 79 (2019) 106034.

Kim, et al., "Wearable biosensors for healthcare monitoring", Nature Biotechnology, vol. 37, Apr. 2019, www.nature.com/naturebiotechnology, 389-406.

Koh, et al., "A Soft, Wearable Microfluidic Device for the Capture, Storage, and Colorimetric Sensing of Sweat", Sci Transl Med. Nov. 23, 2016; 8(366): 366ra165. doi:10.1126/scitranslmed.aaf2593.

Koide, et al., "Retinal Hazard from Blue Light Emitting Diode", Jpn J Ophthalmol vol. 46: 2002, 234-235.

Liu, et al., "Gold nanoparticles-loaded contact lenses for laser protection and Meibomian Gland Dysfunction (MGD) dry eye treatment", Colloids and Surfaces A: Physicochemical and Engineering Aspects 635 (2022) 128053.

Maldonado-Codina, et al., "In vitro water wettability of silicone hydrogel contact lenses determined using the sessile drop and captive bubble techniques", Journal of Biomedical Materials Research Part A DOI 10.1002/jbm.a, May 14, 2007, 496-502.

Matzeu, et al., "Advances in wearable chemical sensor design for monitoring biological fluids", Sensors and Actuators B: Chemical 211 (2015) 403-418.

Moreddu, et al., "Contact lenses for continuous corneal temperature monitoring", RSC Adv., 2019, 9, 11433-11442, Apr. 11, 2019.

Morgan, et al., "Ocular physiology and comfort in neophyte subjects fitted with daily disposable silicone hydrogel contact lenses", Contact Lens & Anterior Eye 36 (2013) 118-125.

Pardo-Yissar, et al., "Gold Nanoparticle/Hydrogel Composites with Solvent-Switchable Electronic Properties", Adv. Mater. 2001, 13, No. 17, Sep. 3, 1320-1323.

Remé, et al., "Apoptosis in the Retina: The Silent Death of Vision", News Physiol. Sci., vol. 15, Jun. 2000, www.physiology.org/journal/physiologyonline.

Reynaud, et al., "Nanofillers in polymeric matrix: a study on silica reinforced PA6", Polymer 42 (2001) 8759-8768.

Riaz, et al., "Anthocyanin-Functionalized Contact Lens Sensors for Ocular pH Monitoring", ACS Omega 2019, 4, 21792-21798.

Salih, et al., "Gold Nanocomposite Contact Lenses for Color Blindness Management", ACS Nano 2021, 15, 4870-4880, Feb. 11, 2021.

Salih, et al., "Ophthalmic Wearable Devices for Color Blindness Management", Adv. Mater. Technol. 2020, 5, 1901134.

Salih, et al., "Silver Nanoparticle-Loaded Contact Lenses for Blue-Yellow Color Vision Deficiency", Phys. Status Solidi A 2022, 219, 2100294, Nov. 12, 2021.

Savariraj, et al., "Ophthalmic Sensors and Drug Delivery", ACS Sens. 2021, 6, 2046-2076, May 27, 2021.

Sheeney-Haj-Ichia, et al., "Control of the Electronic Properties of Thermosensitive Poly(N-isopropylacrylamide) and Au-Nanoparticle/Poly(N-isopropylacrylamide) Composite Hydrogels upon Phase Transition", Adv. Funct. Mater. 2002, 12, No. 1, January, 27-32.

Sonner, et al., "The microfluidics of the eccrine sweat gland, including biomarker partitioning, transport, and biosensing implications", Biomicrofluidics 9, 031301 (2015), May 15, 2015, 1-19.

Stapleton, et al., "Silicone Hydrogel Contact Lenses and the Ocular Surface", The Ocular Surface, Jan. 2006, vol. 4, No. 1 www.theocularsurface.com, 24-43.

Tähkämö, et al., "Systematic review of light exposure impact on human circadian rhythm", Chronobiology International, 36:2, 151-170, DOI:10.1080/07420528.2018.1527773, Oct. 12, 2018.

Thomas, et al., "Breathing-In/Breathing-Out Approach to Preparing Nanosilver-Loaded Hydrogels: Highly Efficient Antibacterial Nanocomposites", Journal of Applied Polymer Science, vol. 111, 934-944 (2009), Oct. 17, 2008, 934-944.

\* cited by examiner

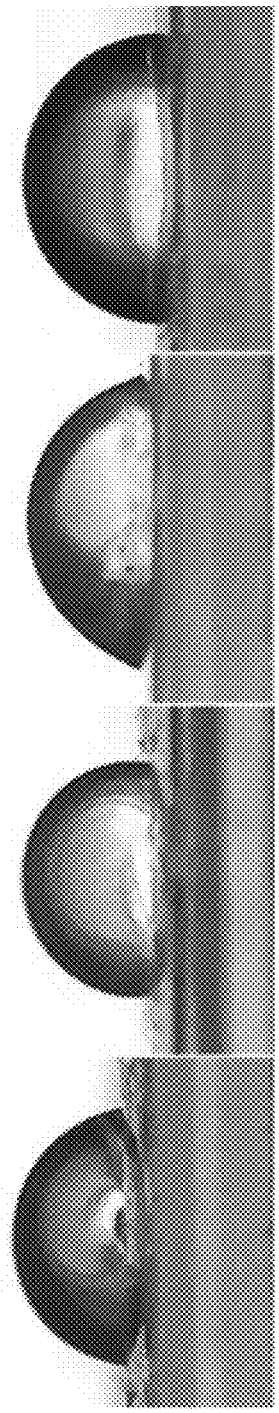
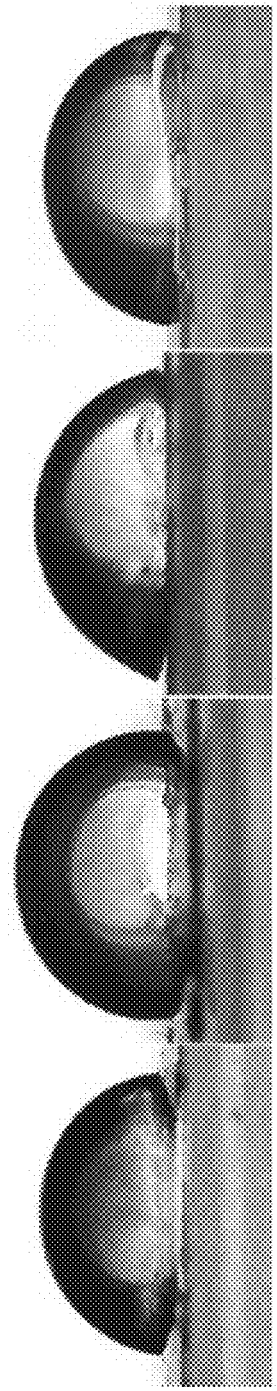
FIG. 14A  FIG. 14B  FIG. 14C  FIG. 14D
FIG. 14E  FIG. 14F  FIG. 14G  FIG. 14H

NANOCOMPOSITE CONTACT LENSES VIA CHEMICAL VOLUMETRIC MODULATION OF HYDROGELS

BACKGROUND

Recent need for continuous real-time health monitoring has increased and facilitated the progress of noninvasive wearable techniques and devices. Early methods were primarily aimed at monitoring physical activities like steps count and heart rate. Wearables such as skin patches, smart contact lenses, and wrist straps enabled targeting and real-time monitoring major diseases and conditions including diabetes, glaucoma, and cystic fibrosis. Currently, smart wearables are not only being used in patients' health monitoring but also in combating and correcting ocular diseases and deficiencies like blindness, color vision, and dyslexia. Contact lenses may be utilized for monitoring various physiological attributes such as tear glucose concentration, corneal temperature, and ocular pH. There remains a need for an efficient method of introducing nanoparticles into contact lenses with known physiochemical properties.

SUMMARY

According to one aspect, a method of incorporating nanoparticles into a contact lens includes contacting the contact lens with a solvent sufficient to remove liquid from the contact lens and contacting the contact lens with colloidal nanoparticles sufficient to transfer nanoparticles from the colloidal nanoparticles to the contact lens.

According to another aspect, a method of incorporating nanoparticles into a contact lens includes performing at least two cycles including contacting the contact lens with an aprotic solvent sufficient to remove liquid from the contact lens and contacting the contact lens with colloidal nanoparticles sufficient to transfer nanoparticles into pores of the contact lens. The method further includes washing the contact lens with liquid to remove unabsorbed surface nanoparticles.

According to another aspect, a light filtering contact lens includes a hydrogel layer including inner pores and an outer surface and metal nanoparticles, wherein the metal nanoparticles are dispersed within the inner pores of the hydrogel layer, the outer surface is substantially nanoparticle-free, and the contact lens blocks over 25% of light ranging from 400 nm to 450 nm.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 14A illustrates an image of the contact angle measurements of an unmodified lens with 3 µL of water drops, according to some embodiments.

FIG. 14B illustrates an image of the contact angle measurements of a gold NCCL with 3 µL of water drops, according to some embodiments.

FIG. 14C illustrates an image of the contact angle measurements of a silver NCCL with 3 μL of water drops, according to some embodiments.

FIG. 14D illustrates an image of the contact angle measurements of a lens that underwent five BI-BO cycles without using nanoparticles and utilizing 3 μL of water drops, according to some embodiments.

FIG. 14E illustrates an image of the contact angle measurements of an unmodified lens with 5 μL of water drops, according to some embodiments.

FIG. 14F illustrates an image of the contact angle measurements of a gold NCCL with 5 μL of water drops, according to some embodiments.

FIG. 14G illustrates an image of the contact angle measurements of a silver NCCL with 5 μL of water drops, according to some embodiments.

FIG. 14H illustrates an image of the contact angle measurements of a lens that underwent five BI-BO cycles without using nanoparticles and utilizing 5 μL of water drops, according to some embodiments.

DETAILED DESCRIPTION

Embodiments of the present disclosure describe a novel approach to incorporate nanoparticles into hydrogels and contact lenses. The nanoparticles are transferred from a solution into the pores of the contact lenses. These nanoparticles are preserved in the contact lenses. As a result, these nanoparticles are sufficient to absorb various wavelengths of light, making the contact lenses sufficient for various biomedical applications.

Figure 1:
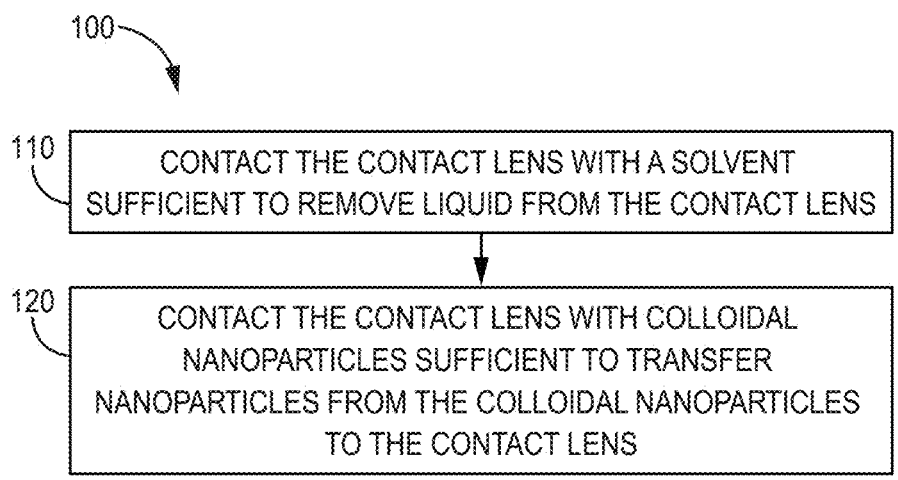
FIG. 1 illustrates a method 100 of incorporating nanoparticles into a contact lens, according to some embodiments.

Referring to FIG. 1, a method 100 of incorporating nanoparticles into a contact lens is illustrated. The method 100 includes the following steps:

STEP 110, CONTACT THE CONTACT LENS WITH A SOLVENT SUFFICIENT TO REMOVE LIQUID FROM THE CONTACT LENS, includes contacting the contact lens with a solvent, such as an aprotic solvent, sufficient to remove liquid, such as water, from the contact lens. Contacting the contact lens with the solvent may include dipping the contact lens in the solvent, immersing the contact lens in the solvent, or adding the solvent to the surface of the contact lens. The solvent may substantially surround the contact lens. Contacting may include any means of placing the contact lens and the solvent in physical contact. Removing liquid may include removing or expelling one or more of water and contact lens solution from the contact lens. In one example, contacting the contact lens with the solvent shrinks the contact lens. In another example, contacting the contact lens with the solvent opens the pores of the contact lens.

The contact lens may be contacted with the solvent for a period sufficient to remove liquid from the contact lens. For example, the contact lens may be placed in the solvent for 1 minute to 10 minutes. In another example, the contact lens may be placed in the solvent for 2 minutes to 5 minutes. In yet another example, the contact lens is placed in the solvent for about 2 minutes.

The contact lens may include polymer or silicon hydrogels and silica-based materials. In one example, the contact lens may include one or more of hydroxyethyl methacrylate (HEMA), ethylene glycol dimethylacrylate, polyvinyl pyrrolidone (PVP), and a siloxane monomer. The contact lens material may include about 75% to about 85% of 3,4 polymers. In another example, the contact lens may include etafilcon A, delefilcon A, narafilcon A, seconfilcon A, and senofilcon C. In yet another example, the contact lens may include comfilcon A, fanfilcon A, ocufilcon D, omafilcon B, somofilcon A, and stenfilcon A. The contact lens may be commercially available contact lenses.

The contact lens may include hydrogel, water, and contact lens solution. The water content of the contact lens may range from 20% to 80%. In one nonlimiting example, the water content of the contact lens ranges from 35% to 60%. The contact angle of the contact lens may be any angle that is hydrophilic. In one example, the contact angle of the contact lens is less than 90°. In another example, the contact angle of the contact lens is between 60° to 70°. In another example, the contact angle of the contact lens is between 70° and 85°. The solvent may be an aprotic solvent. For example, the solvent may be one or more of acetone, tetrahydrofuran (THF), ethyl acetate (EA), acetonitrile (MeCN), dimethylformamide (DMF), dimethyl sulfoxide (DMSO), and hexamethylphosphoric triamide (HMPA);

STEP 120, CONTACT THE CONTACT LENS WITH COLLOIDAL NANOPARTICLES SUFFICIENT TO TRANSFER NANOPARTICLES FROM THE COLLOIDAL NANOPARTICLES TO THE CONTACT LENS, includes contacting the contact lens with colloidal nanoparticles, such as gold nanoparticles or silver nanoparticles, sufficient to transfer nanoparticles from the colloidal nanoparticles to the contact lens. Contacting the contact lens with colloidal nanoparticles may include dipping the contact lens in the colloidal nanoparticles, immersing the contact lens in the colloidal nanoparticles, or adding the colloidal nanoparticles to the surface of the contact lens. The colloidal nanoparticles may substantially surround the contact lens. Contacting may include any means of placing the contact lens and the colloidal nanoparticles in physical contact. The nanoparticles in the colloidal nanoparticles may transfer within the pores of the contact lens. In one example, these newly introduced nanoparticles in the contact lens are bonded with electron-rich nitrogen and oxygen species of the polymeric matrix.

The contact lens may be contacted with the colloidal nanoparticles for a period sufficient to transfer nanoparticles into the contact lens. For example, the contact lens may be placed in the colloidal nanoparticles for 1 minute to 10 minutes. In another example, the contact lens may be placed in the colloidal nanoparticles for 2 minutes to 5 minutes. In yet another example, the contact lens is placed in the colloidal nanoparticles for about 2 minutes.

The colloidal nanoparticles may also be considered a nanoparticle solution or aqueous solution. In one example, the diameter of the nanoparticles ranges from 5 nm to 100 nm. In another example, the diameter of the nanoparticles ranges from 15 nm to 45 nm. In yet another example, the diameter of the nanoparticles ranges from 20 nm to 40 nm. A preferred size of nanoparticles may be chosen based on the pore size of the contact lens. If the pore size is increased, the size of the nanoparticles may be increased.

In one example, the concentration of nanoparticles in the colloid ranges from 0.01 mg/mL to 0.1 mg/mL. In another example, the concentration of nanoparticles in the colloid ranges from 0.01 mg/mL to 0.03 mg/mL. An increased concentration of nanoparticles in the colloid may lead to an increased concentration in the contact lens. Alternatively, the colloid may be diluted to decrease the concentration. The nanoparticles may be capped with an agent such as citrate or phosphate. The capping agent may decrease nanoparticle aggregation. The nanoparticles may be commercially available nanoparticles.

The nanoparticles may include metallic nanoparticles. For example, the nanoparticles may include gold and silver nanoparticles. The nanoparticles may be functionalized nanoparticles. For example, the nanoparticles may be functionalized with 3-mercaptopropionic acid (MPA). Surface functionalization of the nanoparticles with external groups can be used for sensors that are responsive to temperature, pH, and numerous ions;

Nanoparticles may be preserved in the contact lens after just one cycle. In one example, method 100 may include 1 cycle to 30 cycles. In another example, method 100 includes 2 cycles to 20 cycles. For example, repeating STEP 110 after STEP 120 may assist in preserving nanoparticles in the contact lens. Preserving the nanoparticles in the contact lens may include entrapping or trapping the nanoparticles in the pores and the contact lens itself. Preserving may include physically trapping or chemically bonding to ensure stability of the nanoparticles and substantially prevent movement or leaching of the particles. In one example, placing the lens in the solvent after it was swollen in the colloid, containing nanoparticles, will not cause it to expel the newly introduced nanoparticles, as the nanoparticles are bonded with electron-rich nitrogen and oxygen species of the polymeric matrix. Further, the same or different solvent may be used for each cycle. Method 100 may further include a washing step. The washing step may include washing the contact lens with liquid to remove unabsorbed surface nanoparticles. The contact lens may be washed with deionized water or solvents. For example, alcoholic solvents may be utilized to wash the contact lens. In one example, the washing step is completed after all cycles are complete.

Method 100 provides an efficient and low-cost method for incorporating nanoparticles into the contact lens. Method 100 may be used with manufactured commercial contact lenses and may not require heating and curing. Since this method does not include synthesizing the lenses themselves, the physiochemical properties of the lenses are known prior to incorporating the nanoparticles. For example, the modulus, wettability, and oxygen permeability properties are known. This is important because these properties are difficult to characterize and require sophisticated equipment. Further, method 100 may be used with pre-formed colloidal nanoparticle solutions. This gives a known starting concentration of nanoparticles to control the concentration transferred to the contact lens. These contact lenses with incorporated nanoparticles are suitable for various biomedical applications such as color filtering and sensing. Method 100 is suitable for these applications due to the ability of incorporating nanoparticles within the matrix instead of only on the surface of the lens.

Figure 2:
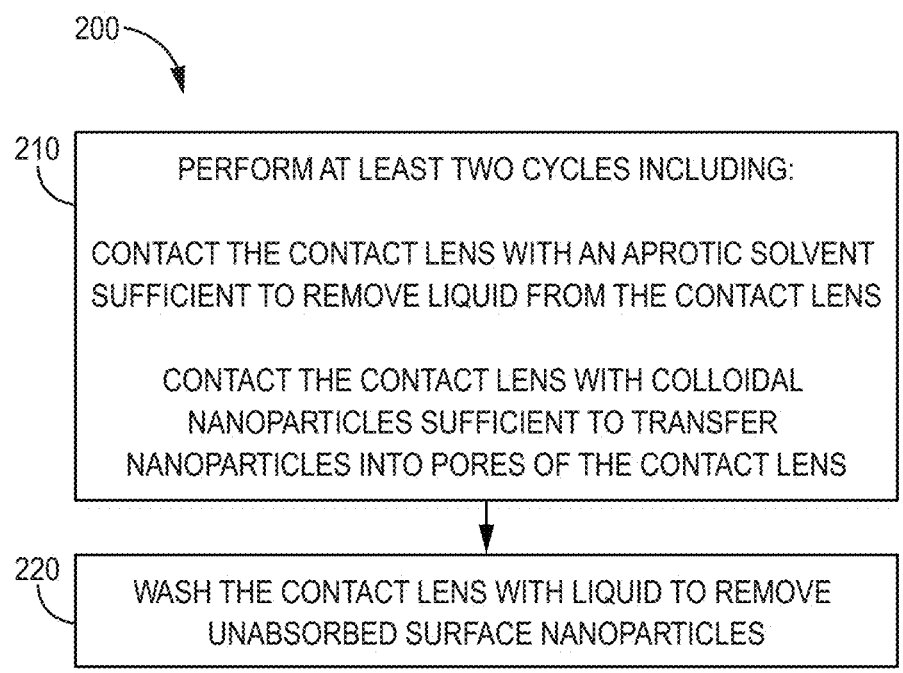
FIG. 2 illustrates a method 200 of incorporating nanoparticles into a contact lens, according to some embodiments.

FIG. 2 illustrates a method 200 of incorporating nanoparticles into contact lenses. The method 200 includes the following steps:

STEP 210, PERFORM AT LEAST TWO CYCLES INCLUDING, includes performing at least two cycles of contacting the contact lens with an aprotic solvent sufficient to remove liquid from the contact lens and contacting the contact lens with colloidal nanoparticles sufficient to transfer nanoparticles into pores of the contact lens. For example, two, three, four, or more cycles of method 200 may be performed. In one example, more than 10 cycles of method 200 are performed. In another example, more than 20 cycles of method 200 are performed.

The contact lens may include polymer or silicon hydrogels and silica-based materials. In one example, the contact lens may include one or more of hydroxyethyl methacrylate (HEMA), ethylene glycol dimethylacrylate, polyvinyl pyrrolidone (PVP), and a siloxane monomer. The contact lens material may include about 75% to about 85% of 3,4 polymers. In another example, the contact lens may include etafilcon A, delefilcon A, narafilcon A, seconfilcon A, and senofilcon C. In yet another example, the contact lens may include comfilcon A, fanfilcon A, ocufilcon D, omafilcon B, somofilcon A, and stenfilcon A. The contact lens may be commercially available contact lenses.

Contacting the contact lens with an aprotic solvent sufficient to remove liquid from the contact lens includes contacting the contact lens with an aprotic solvent, such as acetone, sufficient to remove liquid from the contact lens. Contacting the contact lens with an aprotic solvent may include dipping the contact lens in the aprotic solvent, immersing the contact lens in the aprotic solvent, or adding the aprotic solvent to the surface of the contact lens. The aprotic solvent may substantially surround the contact lens. Contacting may include any means of placing the contact lens and the aprotic solvent in physical contact.

Removing liquid may include removing or expelling one or more of water and contact lens solution from the contact lens. In one example, contacting the contact lens with the aprotic solvent shrinks the contact lens. In another example, contacting the contact lens with the aprotic solvent opens the pores of the contact lens.

The contact lens may be contacted with the aprotic solvent for a period sufficient to remove liquid from the contact lens. For example, the contact lens may be placed in the aprotic solvent for 1 minute to 10 minutes. In another example, the contact lens may be placed in the aprotic solvent for 2 minutes to 5 minutes. In yet another example, the contact lens is placed in the aprotic solvent for about 2 minutes. The aprotic solvent may be one or more of acetone, tetrahydrofuran (THF), ethyl acetate (EA), acetonitrile (MeCN), dimethylformamide (DMF), dimethyl sulfoxide (DMSO), and hexamethylphosphoric triamide (HMPA).

Contacting the contact lens with colloidal nanoparticles sufficient to transfer nanoparticles into pores of the contact lens includes contacting the contact lens with colloidal nanoparticles, such as including gold nanoparticles or silver nanoparticles, sufficient to transfer nanoparticles into pores of the contact lens. Contacting the contact lens with colloidal nanoparticles may include dipping the contact lens in the colloidal nanoparticles, immersing the contact lens in the colloidal nanoparticles, or adding the colloidal nanoparticles to the surface of the contact lens. The colloidal nanoparticles may substantially surround the contact lens. Contacting may include any means of placing the contact lens and the colloidal nanoparticles in physical contact.

The contact lens may be contacted with the colloidal nanoparticles for a period sufficient to transfer nanoparticles into the contact lens. For example, the contact lens may be placed in the colloidal nanoparticles for 1 minute to 10 minutes. In another example, the contact lens may be placed in the colloidal nanoparticles for 2 minutes to 5 minutes. In yet another example, the contact lens is placed in the colloidal nanoparticles for about 2 minutes.

The colloidal nanoparticles may also be considered a nanoparticle solution or aqueous solution. In one example, the diameter of the nanoparticles ranges from 5 nm to 100 nm. In another example, the diameter of the nanoparticles ranges from 15 nm to 45 nm. In yet another example, diameter of the nanoparticles ranges from 20 nm to 40 nm. A preferred size of nanoparticles may be based on the pore size of the contact lens. In one example, the nanoparticles are bonded with electron-rich nitrogen and oxygen species of the polymeric matrix.

In one example, the concentration of nanoparticles in the colloid ranges from 0.01 mg/mL to 0.1 mg/mL. In another example, the concentration of nanoparticles in the colloid ranges from 0.01 mg/mL to 0.03 mg/mL. An increased concentration of nanoparticles in the colloid may lead to an increased concentration in the contact lens. The nanoparticles may be capped with an agent such as citrate or phosphate. The capping agent may decrease nanoparticle aggregation.

The nanoparticles may include metallic nanoparticles. For example, the nanoparticles may include gold and silver nanoparticles. The nanoparticles may be functionalized nanoparticles. For example, the nanoparticles may be functionalized with 3-mercaptopropionic acid (MPA). Surface functionalization of the nanoparticles with external groups can be used for sensors that are responsive to temperature, pH, and numerous ions;

Additional cycles of step 210 may be completed to increase the amount of nanoparticles preserved in the contact lens. Preserving the nanoparticles in the contact lens may include entrapping or trapping the nanoparticles in the pores and the contact lens itself. In one example, placing the contact lens in the aprotic solvent after it was swollen in the colloid, containing nanoparticles, will not cause it to expel the newly introduced nanoparticles, as the nanoparticles are bonded with electron-rich nitrogen and oxygen species of the polymeric matrix. Further, the same or different solvent may be used for each cycle;

STEP 220, WASH THE CONTACT LENS WITH LIQUID TO REMOVE UNABSORBED SURFACE NANOPARTICLES, includes washing the contact lens with liquid, such as deionized water, sufficient to remove unabsorbed surface nanoparticles, if any are present. The liquid may include deionized water. The liquid may include solvents such as alcoholic solvents. Washing may include contacting the liquid with the contact lens.

Similar to method 100, method 200 provides an efficient and low-cost method of incorporating nanoparticles in contact lenses. The number of cycles can be increased to increase the concentration of nanoparticles in the contact lens. Therefore, the concentration can be tuned for various biomedical applications. The concentration in the contact lens can be tuned for adjusting the transmission and light filtering. In one example, in 20 cycles or more, the transmission at certain wavelengths may decrease by over 30%.

Figure 3:
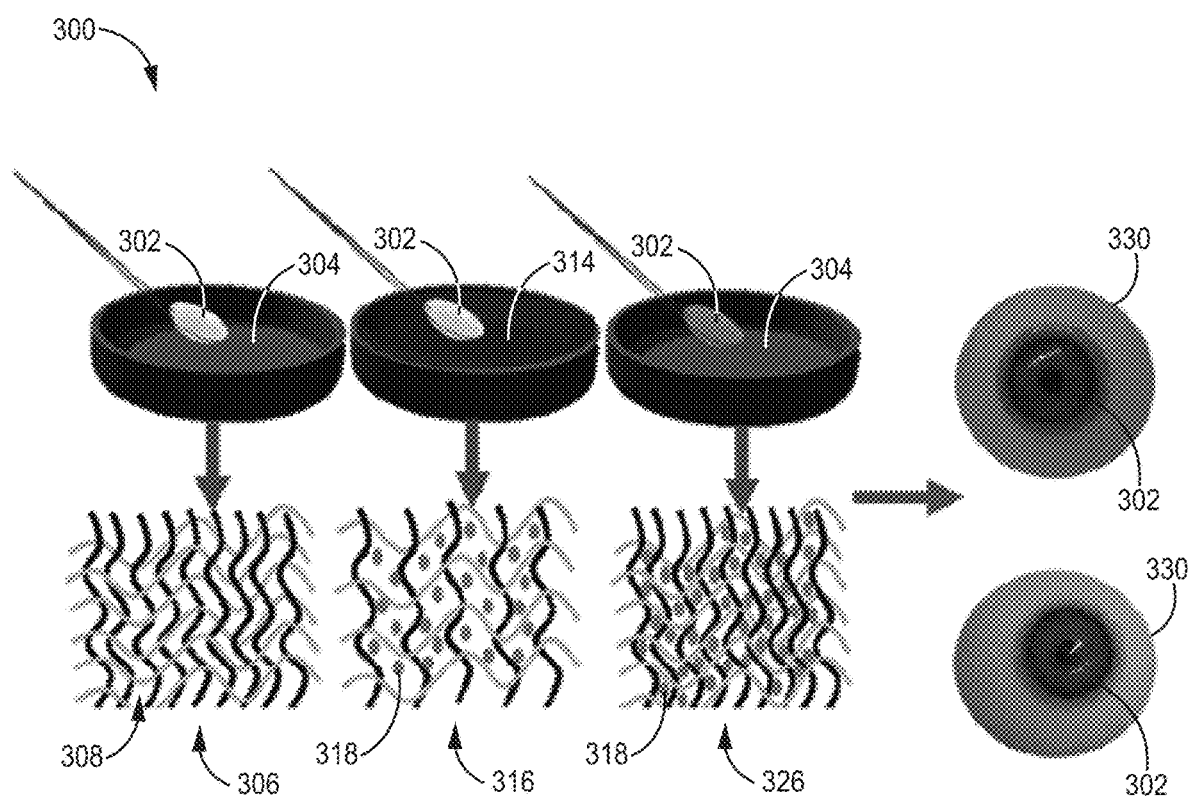
FIG. 3 illustrates a schematic of a process 300 for incorporating nanoparticles into a contact lens, according to some embodiments.

FIG. 3 illustrates a schematic of process 300 for making a nanocomposite contact lens (NCCL). Process 300 includes contact lens 302, aprotic solvent 304, lens network 306, pores 308, colloidal nanoparticles 314, lens network with nanoparticles 316, nanoparticles 318, lens network with preserved nanoparticles 326, and eye 330. Process 300 may be completed in one or more cycles. For example, process 300 may be completed in 10-30 cycles.

Contact lens 302 is placed in aprotic solvent 304 for a certain amount of time. Lens network 306 illustrates the contact lens network after being placed in the aprotic solvent 304. Pores 308 are shown in the lens network 306. The aprotic solvent 304 opens the pores 308 in the contact lens 302. Contact lens 302 is then placed in colloidal nanoparticles 314 and swells. Lens network with nanoparticles 316 illustrates that nanoparticles 318 have transferred into the lens network as originally shown in lens network 306. Placing the contact lens 302 in aprotic solvent 304 and then colloidal nanoparticles 314 represents one cycle. Contact lens 302 is then placed in aprotic solvent 304 again. Lens network with preserved nanoparticles 326 is shown as an illustration of the contact lens network after being placed in aprotic solvent 304. The nanoparticles 318 are preserved or entrapped within the lens network with preserved nanoparticles 326. Contact lens 302 is shown on eye 330.

Contact lens 302 may include polymer or silicon hydrogels and silica-based materials. In one example, the contact lens may include hydroxyethyl methacrylate, ethylene glycol dimethylacrylate, polyvinyl pyrrolidone, and a siloxane monomer. The contact lens 302 material may include about 75% to about 85% of 3,4 polymers. In another example, the contact lens 302 may include etafilcon A, delefilcon A, narafilcon A, seconfilcon A, and senofilcon C. In yet another example, the contact lens 302 may include comfilcon A, fanfilcon A, ocufilcon D, omafilcon B, somofilcon A, and stenfilcon A.

The contact lens 302 may include water and contact lens solution. The water content of the contact lens 302 may range from 20% to 80%. In one nonlimiting example, the water content of the contact lens 302 ranges from 35% to 60%. The contact angle of the contact lens 302 may be any angle that is hydrophilic. In one example, the contact angle of the contact lens 302 is less than 90°. In another example, the contact angle of the contact lens 302 is between 60° to 70°. Aprotic solvent 304 may be one or more of acetone, tetrahydrofuran (THF), ethyl acetate (EA), acetonitrile (MeCN), dimethylformamide (DMF), dimethyl sulfoxide (DMSO), and hexamethylphosphoric triamide (HMPA).

Colloidal nanoparticles 314 may include metallic or metal nanoparticles. For example, the colloidal nanoparticles 314 may include gold and silver nanoparticles. The colloidal nanoparticles 314 may be functionalized nanoparticles. For example, the colloidal nanoparticles 314 may be functionalized with 3-mercaptopropionic acid (MPA). Functionalized nanoparticles may have some molecules attached to the nanoparticles and can be utilized for drug delivery. Functionalization may be based on surface charges and polarity. Surface functionalization of the colloidal nanoparticles 314 with external groups can be used for sensors that are responsive to temperature, pH, glucose, and numerous ions. In this example, the functionalized nanoparticles may aggregate or disassemble according to pH changes.

The concentration of nanoparticles in the colloidal nanoparticles 314 ranges from 0.01 mg/mL to 0.1 mg/mL. In another example, the concentration of nanoparticles in the colloidal nanoparticles 314 ranges from 0.01 mg/mL to 0.03 mg/mL. The concentration of nanoparticles in colloidal nanoparticles 314 may be increased or decreased. Nanoparticles 318 are the same as the nanoparticles in colloidal nanoparticles 314.

Importantly, the physiochemical properties are known prior to incorporating nanoparticles 318. Physiochemical properties such as modulus and oxygen permeability are difficult to characterize otherwise. Further, the inherent surface chemistry and wettability of the contact lenses are not altered by the methods above. The contact angle and wettability of the contact lens remained in the acceptable range for commercial contact lens products. These methods also require few chemicals, and the optical properties of the nanoparticles are utilized with optical similarity.

Blue light, which has the highest energy in the visible light range, is one of the prominent causes of phototoxicity. Generally, high energy blue light, which causes maximum retinal damage, has a wavelength ranging from 415 nm to 455 nm. Blue light with wavelengths ranging from 470 nm to 500 nm is crucial for maintaining the normal functionality of several visual functions. The retina is generally exposed to blue light with wavelengths ranging from about 400 nm to about 450 nm. This necessitates the need for selective blue light filtering contact lenses. In one example, a silver nanoparticle contact lens using the methods above is capable of blocking about 25% to 45% of the light in the 400 nm to 450 nm range. This lens is also capable of allowing more than 75% of the incoming light beyond 470 nm. Silver nanoparticles are highly efficient in absorbing and scattering specific portions of the visible light electromagnetic spectrum, which occurs as a result of the excitation of the conduction electrons on the metal surface. This lens is actually more selective than current blue light filtering glasses as it blocks fewer wavelengths of the spectrum. Silver nanoparticles may also have antibacterial properties and may enhance color distinction for blue-yellow color vision deficient patients.

Color vision deficiency may be attributed to patients' inability to distinguish different wavelengths of light. The nanoparticles incorporated by the methods above may have peak absorption properties within the range of filtered wavelengths required to facilitate enhanced color distinction for colorblind patients. In one example, the lenses with gold nanoparticles may have enhanced color distinction in wavelengths ranging from 540 nm to 570 nm. These gold nanoparticles can be incorporated to filter the desired wavelength range. Gold nanoparticles are highly efficient in absorbing and scattering specific portions of the visible light electromagnetic spectrum, which occurs as a result of the excitation of the conduction electrons on the metal surface. These gold nanoparticle lenses are effective in absorbing undistinguishable colors of a patient's spectrum. Gold nanoparticles may also be used as a laser protection measure.

Incorporation of nanoparticles can be utilized for many purposes such as smart contact lenses. Various nanoparticles may be utilized depending on the application. For example, nanoparticles may be used for color filtering, monitoring, and eye protection and treatment. Therefore, there existed a need for an efficient and low-cost method such as the methods described to incorporate nanoparticles into contact lenses.

Incorporation of nanoparticles may change the color or be used to change the color of the contact lens. For example, after the incorporation of nanoparticles, the contact lens may be clear or may be a shade of pink. The contact lens may have a yellow tint. In one example, this incorporation of nanoparticles is stable and does not substantially leach during a one-month period or more. The methods mentioned may be utilized for various types of contact lenses and hydrogels. For example, prescription contact lenses with various prescriptions may be utilized. In another example, contact lenses manufactured with UV blocking capabilities may also be utilized. Contact lenses with various polymers, contact angles, water content, and colors may be used. The methods mentioned are quick, cost effective, and maintain the original properties of the contact lenses. Further, the methods mentioned require few chemicals.

Example 1

One of the main concerns in the synthesis of NCCLs (nanocomposite contact lenses) is not knowing the physiochemical properties of the fabricated contact lenses, such as the modulus, wettability, and oxygen permeability, which are difficult to characterize and require sophisticated equipment. However, those properties are well established and documented for commercial contact lenses. Dipping or soaking commercial contact lenses in colloidal nanoparticles usually does not result in permeation of the nanoparticles through the lenses' pores. Hence, the unique breathing-in/breathing-out (BI-BO) method of incorporating nanoparticles into gels is utilized.

Introduction of nanoparticles into the lens occurs in two steps: (1) the swollen gel is placed in an aprotic solvent and gets deswollen by expelling water (breathing-out); and (2) dipping the shrunken gel into an aqueous solution containing nanoparticles (breathing-in). Upon the next BO step, nanoparticles are preserved within the gel's matrix. Acuvue Trueye (narafilcon A), a common commercial contact lens, was utilized in this study. Ease of loading gold and silver nanoparticles into commercial contact lenses can make these nanocomposites suitable for various applications, one of which is color filtering. Owing to the surface plasmon resonance (SPR), gold and silver nanoparticles are highly efficient in absorbing and scattering specific portions of the visible light electromagnetic spectrum, which occurs as a result of the excitation of the conduction electrons on the metal's surface at specific finite wavelengths. Silver nanoparticles absorb visible light in the range of 400 nm-490 nm (depending on respective size).

Figure 4:
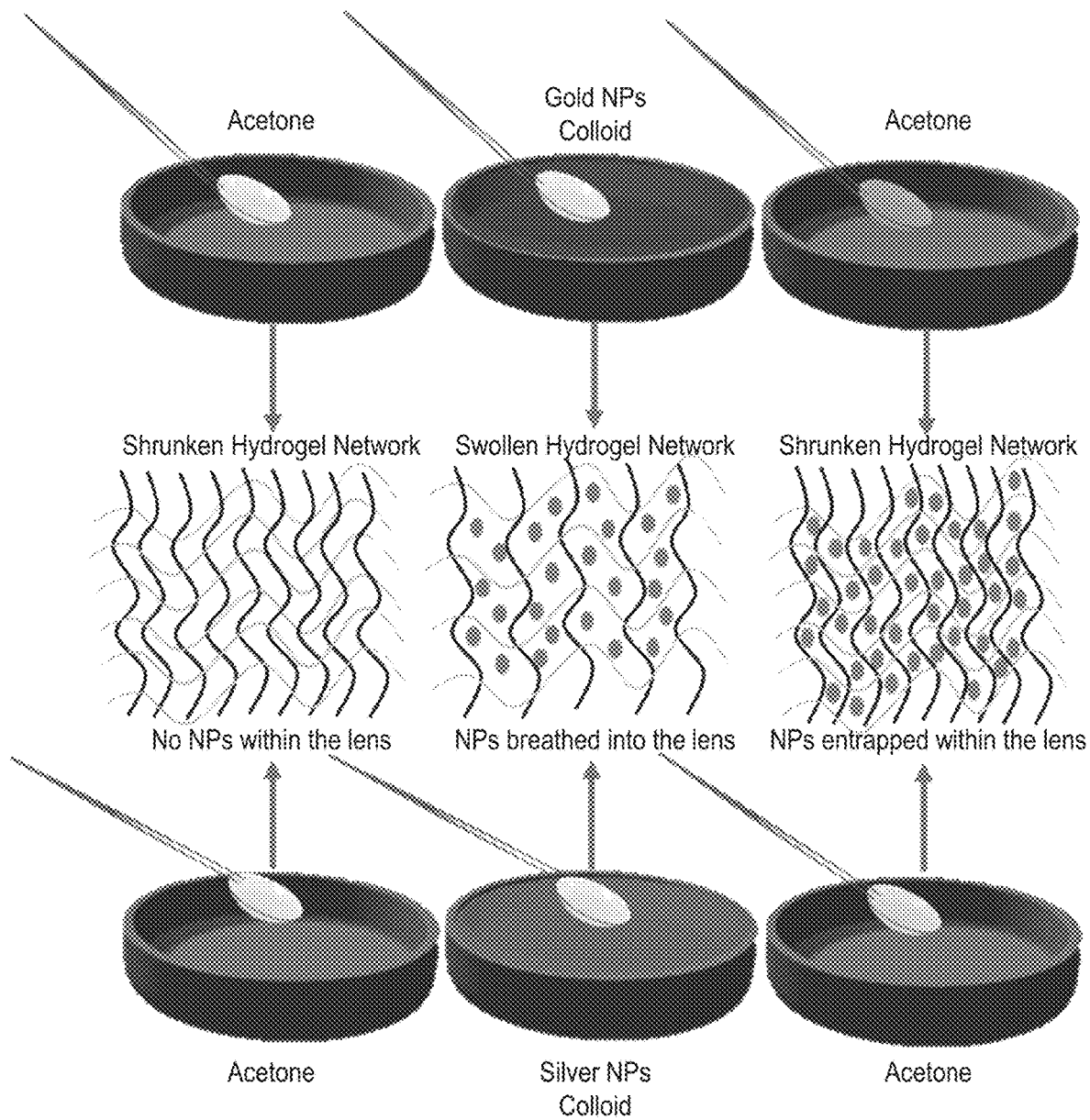
FIG. 4 illustrates a schematic of incorporating gold and silver nanoparticles into contact lenses, according to some embodiments.

FIG. 4 illustrates a schematic of incorporating gold and silver nanoparticles into contact lenses utilizing the BI-BO method. The Acuvue contact lenses were placed in 10 mL of acetone for 2 minutes and then placed in 10 mL of colloidal nanoparticles. This cycle was repeated multiple times for both sets of nanoparticles to show its effect on the optical and material properties. The contact lenses were then washed using deionized water to remove any unabsorbed nanoparticles. Samples were kept for further analysis in a contact lens storage solution at 25° C. Gold nanoparticles (20 nm), stabilized in phosphate buffer solution (PBS) with 0.1 mM concentration, and 40 nm silver nanoparticles, dispersed in PBS with a concentration of 0.02 mg/mL, were used without further purification. Acetone, as an aprotic solvent, and 1-Day Acuvue TruEye contact lenses were utilized.

Primary characterizations were done to assess the optical and material properties of the NCCLs. The optical and morphological properties of the nanoparticles were studied prior to the lens characterization. The transmission spectrum of the colloidal nanoparticles was obtained using a UV-vis spectrophotometer, which was connected to an optical microscope. The utilized spectrophotometer operates in the range of 200 nm-1100 nm. Furthermore, 500 µL was deposited into a cuvette, and the transmission spectrum was recorded using Ocean-View software. The morphology of the nanoparticles in solutions was obtained utilizing a TEM 200 kV, which has a resolution of 0.24 nm, and voltage varying from 20 to 200 kV. Further, 15 µL of the nanoparticle solution was placed on copper mesh grids and allowed to dry at room temperature. This was repeated multiple times to have a considerable amount of nanoparticles in the mesh grid. Size and distribution analysis of the resulting images was done using ImageJ software. Similarly, the transmission spectra of the NCCLs were obtained using the same procedure previously outlined. The latter was recorded at multiple BI-BO cycles, namely, 5, 10, 15, and 20, to show the subsequent influence on the optical properties of the contact lenses. The stability of the nanoparticles within the lenses was also assessed by measuring the transmission spectra over one month.

The water retention of the NCCLs was determined by recording the dry weight and comparing it with the fully hydrated weight. To ensure that the samples were completely dried, they were placed in a vacuum oven at 50° C. for 2 hours. The samples were then immersed in deionized water for 72 hours to ensure the maximum water retention possible. The total weight and corresponding water content of the lenses were analyzed at multiple time intervals to assess the transient water retention using Equation 1:

$$\text{water content (\%)} = \frac{\text{total weight} - \text{dry state weight}}{\text{total weight}} \quad (1)$$

The characterizations were performed on one clear (unaltered) contact lens, a lens treated with five BI-BO cycles without nanoparticles (only water), and two doped NCCLs to compare the material and optical properties and assess the efficacy of this novel method. For the SEM (scanning electron microscope) imaging, the contact lens was sheared to examine the cross-section of the sample and was then coated with a 7.5 nm layer of platinum, to avoid the charge-up effect.

Figure 5A:
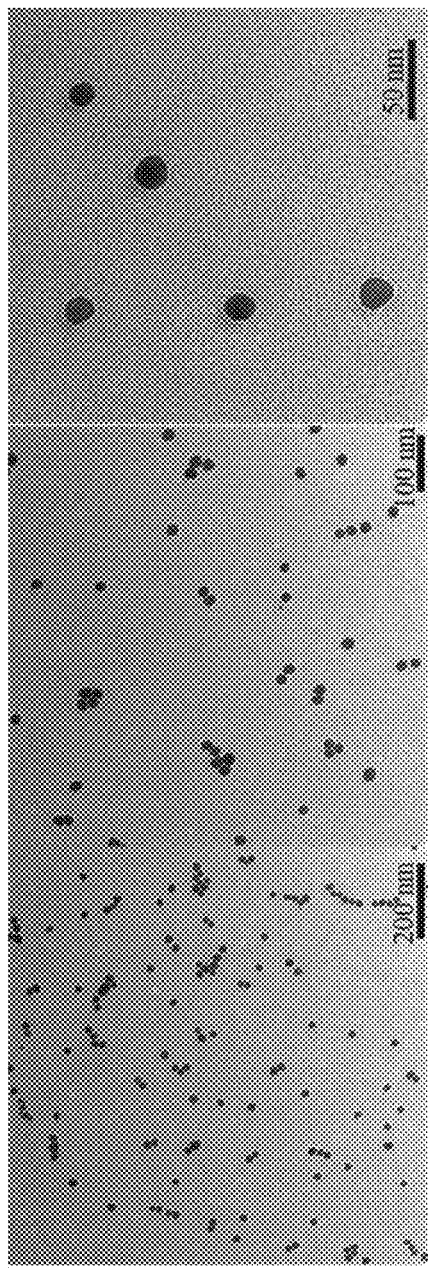
FIG. 5A illustrates the morphology characterization of 20 nm gold nanoparticles with TEM (transmission electron microscopy) images at different magnifications, according to some embodiments.
Figure 5B:
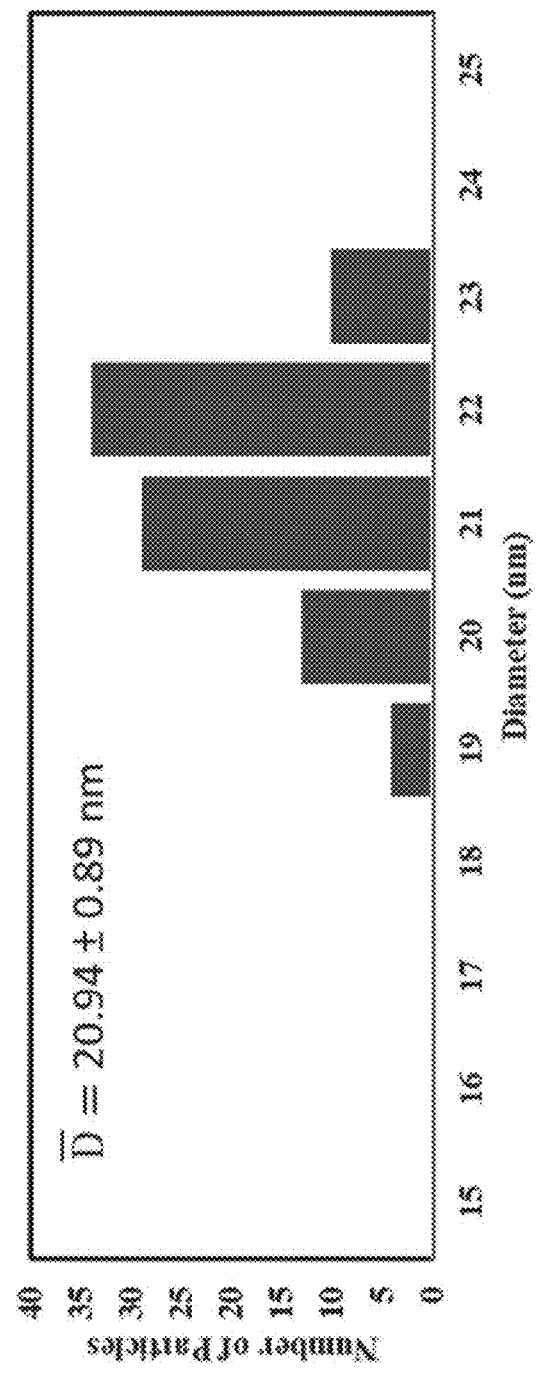
FIG. 5B illustrates the morphology characterization of 20 nm gold nanoparticles with size distribution histograms, according to some embodiments.

FIG. 5A illustrates the morphology characterization of 20 nm gold nanoparticles with TEM (transmission electron microscopy) images at different magnifications. The magnifications shown include 200 nm, 100 nm, and 50 nm. FIG. 5B illustrates the morphology characterization of 20 nm gold nanoparticles with size distribution histograms. A minimum of 100 particles were imaged and analyzed to get an accurate size distribution of the nanoparticles.

Figure 6A:
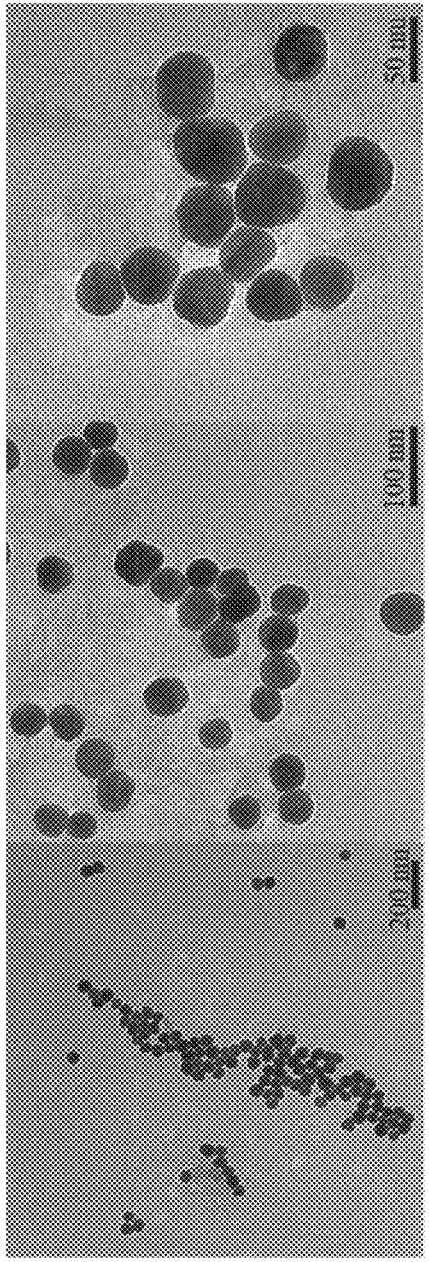
FIG. 6A illustrates the morphology characterization of 40 nm gold nanoparticles with TEM images at different magnifications, according to some embodiments.
Figure 6B:
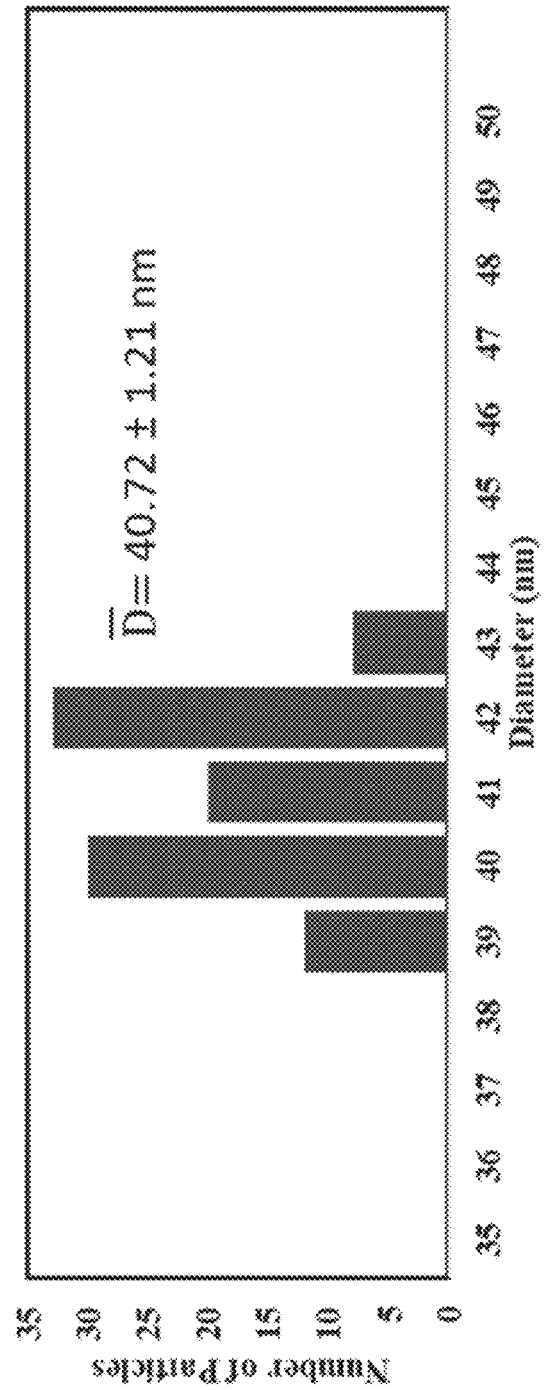
FIG. 6B illustrates the morphology characterization of 40 nm gold nanoparticles with size distribution histograms, according to some embodiments.

FIG. 6A illustrates the morphology characterization of 40 nm gold nanoparticles with TEM images at different magnifications. FIG. 6B illustrates the morphology characterization of 40 nm gold nanoparticles with size distribution histograms. A minimum of 100 particles were imaged and analyzed to get an accurate size distribution of the nanoparticles. As illustrated from the histograms, the average diameters of the gold and silver nanoparticles were 20.94±0.89 and 40.72±1.21 nm, respectively. Standard deviations of both sets of nanoparticles were less than 5%, indicating size homogeneity. As for the distribution of the nanoparticles, TEM images show that gold nanoparticles were more evenly dispersed compared to the silver nanoparticles, which showed more aggregates and formed clusters as shown in FIG. 6A. While preparing the samples for TEM imaging, the concentration and generally the chemical composition of the nanoparticle solution were not altered. Hence, these were the morphologies of the nanoparticles utilized in the contact lenses.

Figure 7A:
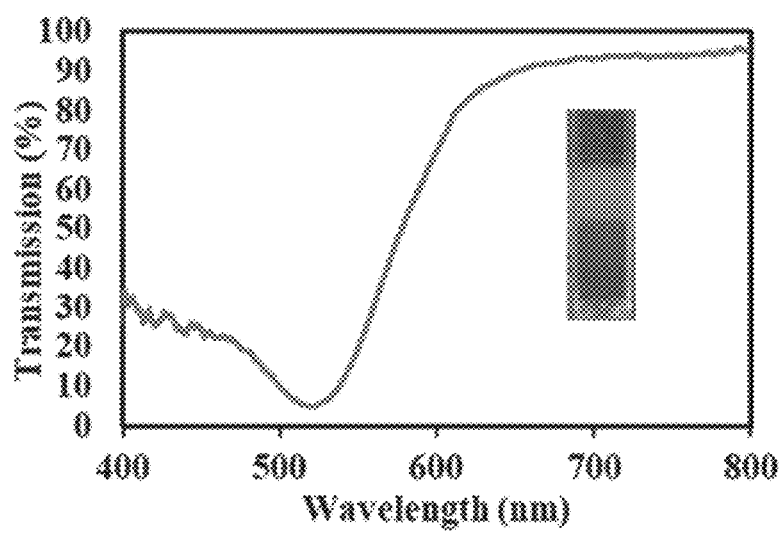
FIG. 7A illustrates transmission spectrum of 20 nm gold nanoparticles in solution, according to some embodiments.
Figure 7B:
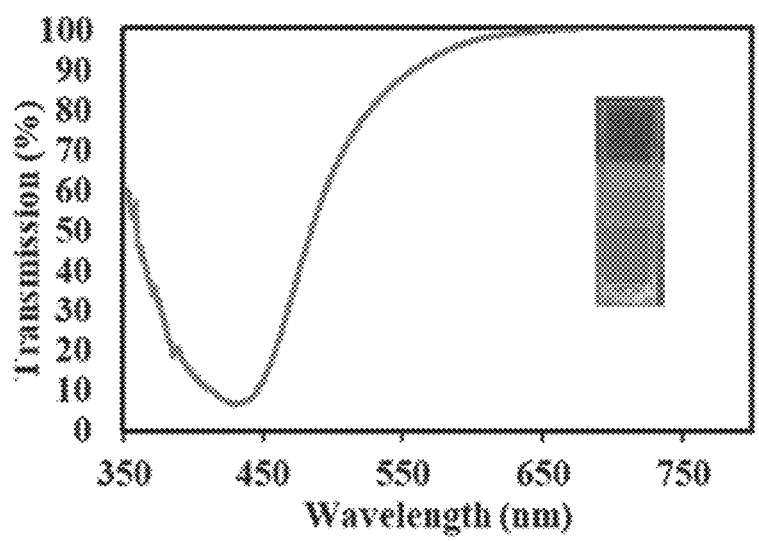
FIG. 7B illustrates transmission spectrum of 40 nm silver nanoparticles in solution, according to some embodiments.

FIG. 7A illustrates transmission spectrum of 20 nm gold nanoparticles in solution. The inset shows an image of the gold nanoparticle solution. FIG. 7B illustrates transmission spectrum of 40 nm silver nanoparticles in solution. The inset shows an image of a silver nanoparticle solution. The surface plasmon resonance or transmission dip of the gold and silver nanoparticles occurred at 522 nm and 430 nm, respectively, and both nanoparticles blocked more than 90% at these wavelengths. Moreover, the full width at half maximum (FWHM), which quantifies the bandwidth of the transmission dip, was 43 nm and 93 nm, respectively. The discrepancy in FWHM between both nanoparticles could be attributed to degree of dispersion, shown through FIGS. 5A-5B and FIGS. 6A-6B. The FWHM of the transmission dip is adversely affected by nanoparticle aggregation, which was evident from the wide transmission dip in the spectra of the aggregated silver nanoparticles.

Aggregation causes the conduction electrons of one nanoparticle (responsible for SPR) close to another one to be delocalized and shared with it, which decreases the energy and frequency required to resonate them. This translates to either a slight broadening of the transmission dip or, in cases of complete aggregation, to disappearance of the SPR. In addition, silver nanoparticles generally exhibit larger bandwidths at the transmission dip compared to gold nanoparticles, which is well explained by the Mie scattering theory. In contrast to the silver NCCL, the transmission bandwidth of the gold NCCL was wider, and the nanoparticle sharp dip flattened out. Nanoparticles smaller than 20 nm have a higher surface to bulk volume ratio, and hence, they have higher surface energies as compared to relatively bigger particles (>40 nm). Therefore, when changing the medium (from water to the polymeric contact lens matrix), aggregation of most gold nanoparticles, in order to reduce overall free energy, caused the apparent abrupt change in transmission spectra from the colloidal state.

Figure 7C:
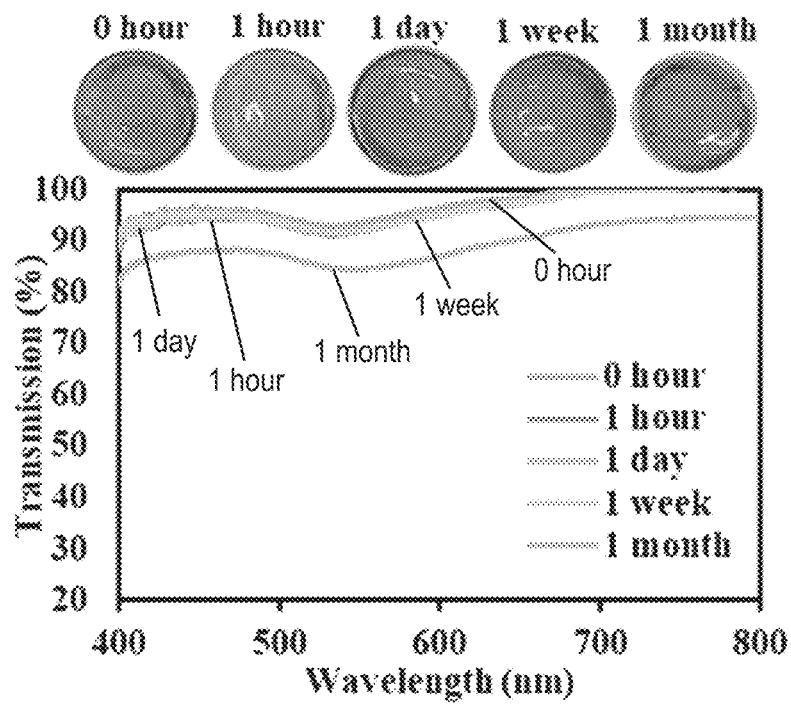
FIG. 7C illustrates transmission spectra of gold nanocomposite contact lenses (NCCLs), developed using the breathing-in/breathing-out (BI-BO) method over a one-month period with images shown at each interval, according to some embodiments.
Figure 7D:
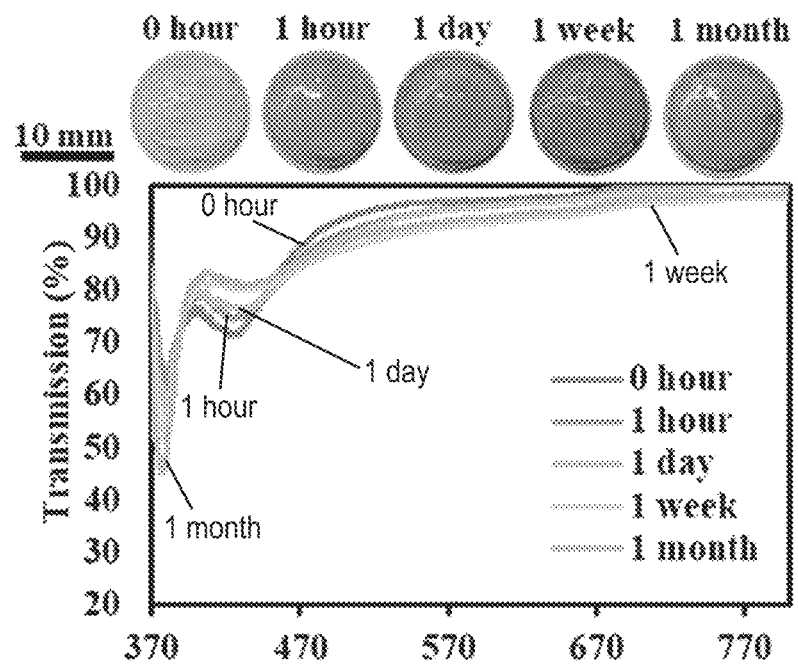
FIG. 7D illustrates transmission spectra of silver NCCLs, developed using the BI-BO method over a one-month period with images shown at each interval, according to some embodiments.

FIG. 7C illustrates transmission spectra of gold NCCLs, developed using the BI-BO method over a one-month period with images shown at each interval. FIG. 7D illustrates transmission spectra of silver NCCLs, developed using the BI-BO method over a one-month period with images shown at each interval. Both FIG. 7C and FIG. 7D illustrate transmission spectra after 15 BI-BO cycles.

The initial transmission spectra (at 0 hours) of the gold and silver NCCLs showed a transmission dip at 532 and 433 nm, respectively. It is worth noting that the transmission dip of the silver NCCL at 380 nm is an inherent UV filtering feature of the Acuvue TruEye contact lens. Comparing the SPR of the NCCLs to the parent nanoparticles, one can note a slight shift, which is due to the change in the refractive index of the medium. The refractive index of narafilcon A is 1.41, whereas the refractive index of the nanoparticle solution is that of water (1.33). The change of SPR wavelength with refractive index occurs mainly due to two reasons: (1) the consequent change of the light wavelength at the nanoparticles' vicinity resulting from the medium's refractive index variation; and (2) the polarization of the nanoparticle dielectric medium, which causes a variation of the effective charge on the nanoparticles' surface. This variation is resembled by a change in the SPR wavelength in the optical spectra.

Figure 7E:
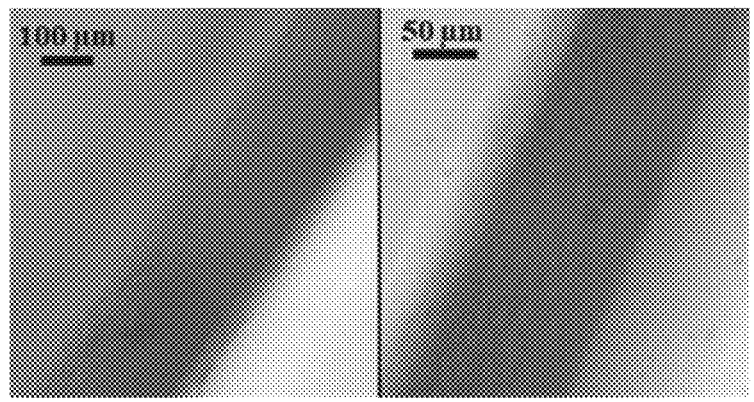
FIG. 7E illustrates microscopic images (transmission mode) of a gold NCCL cross-section at different magnifications showing a homogeneous color, according to some embodiments.
Figure 7F:
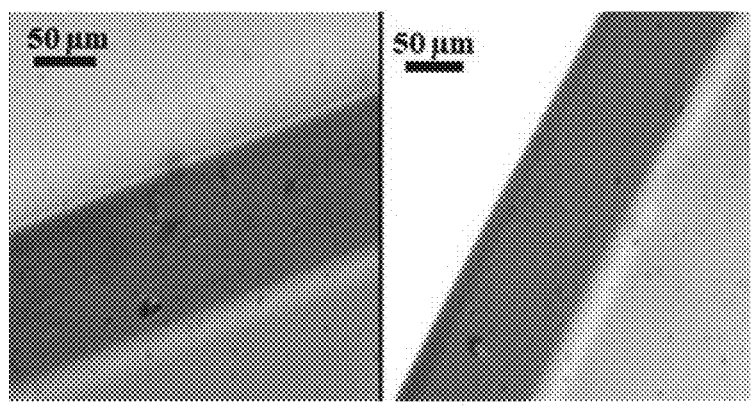
FIG. 7F illustrates microscopic images (transmission mode) of a silver NCCL cross-section at different magnifications showing a homogeneous color, according to some embodiments.

FIG. 7E illustrates microscopic images (transmission mode) of a gold NCCL cross-section at different magnifications showing a homogeneous color. FIG. 7F illustrates microscopic images (transmission mode) of a silver NCCL cross-section at different magnifications showing a homogeneous color. The images are indicative of the homogeneity of the color within the lens and consequently the distribution of the nanoparticles.

Figure 8:
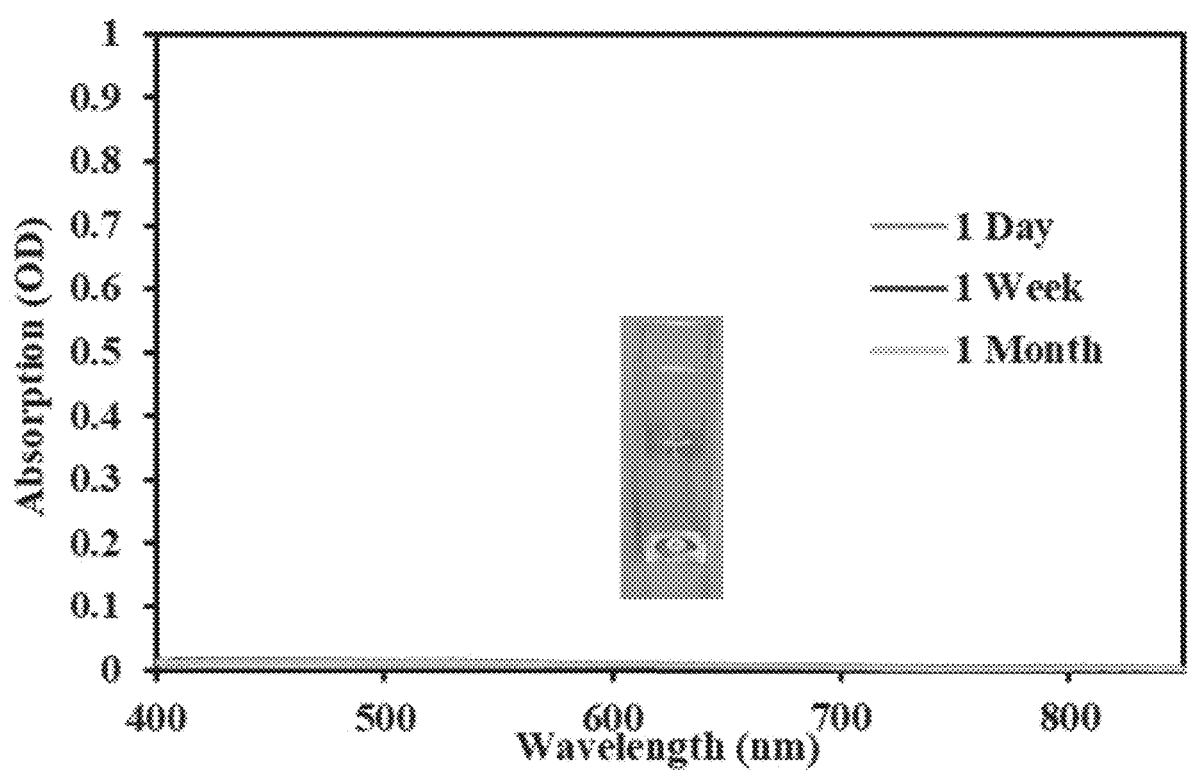
FIG. 8 illustrates optical properties (absorption) of the tear fluid solution in which gold NCCLs were embedded in for one-month, according to some embodiments.
Figure 9:
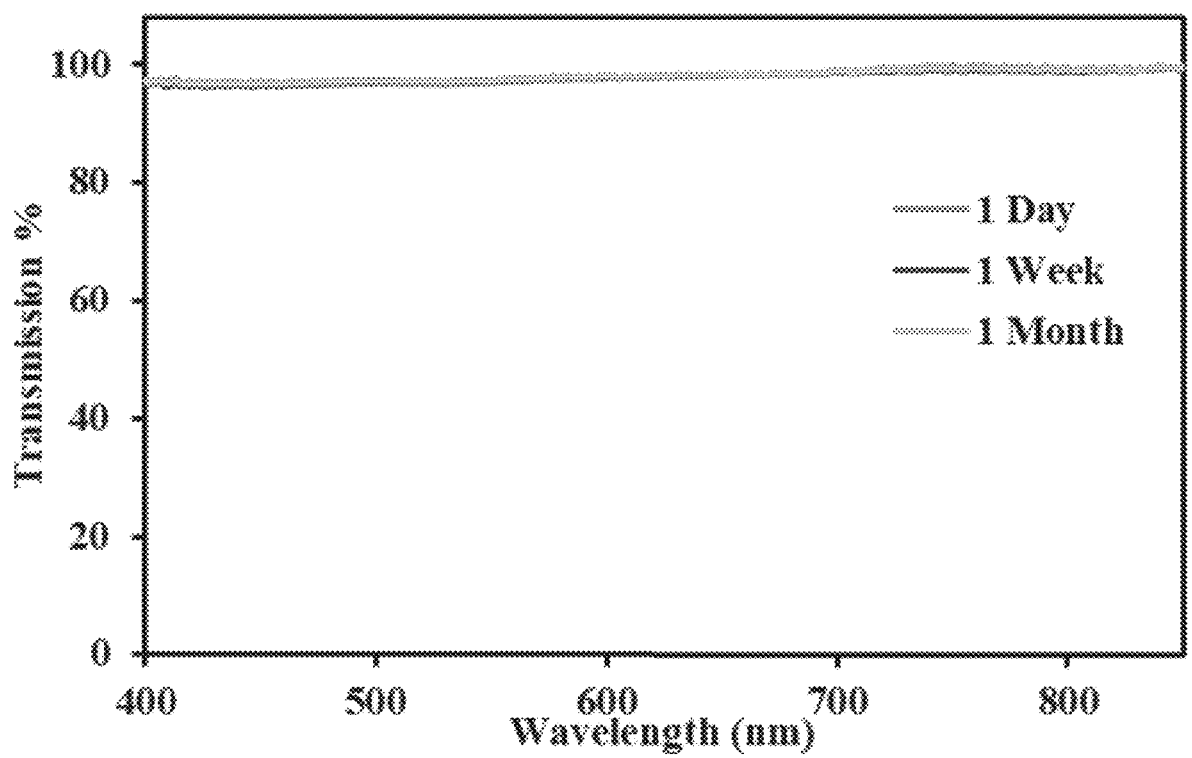
FIG. 9 illustrates optical properties (transmission) of the tear fluid solution in which gold NCCLs were embedded in for one-month, according to some embodiments.

FIG. 8 illustrates optical properties (absorption) of the tear fluid solution in which gold NCCLs were embedded in for one month. The optical properties were examined to check for any possible leaching. The inset shows the tear fluid solution after one month. FIG. 9 illustrates optical properties (transmission) of the tear fluid solution in which gold NCCLs were embedded in for one month. Over the period of one month, the stability of both nanoparticles within the contact lenses was apparent as the transmission spectra remained unchanged, indicating the absence of nanoparticle leakage. This confirmed that no nanoparticle leaching occurred. The stability of the nanoparticles within the matrix can be attributed to two reasons: (1) gold and silver nanoparticles were capped with an agent (citrate/phosphate), which could have aided in the formation of hydrogen bonding between the nanoparticles and the polymer; and (2) the nanoparticles could have also been physically entangled or attached to the contact lens. The utilization of the BI-BO method successfully incorporated nanoparticles into contact lenses, with minimal or no leakage observed.

Figure 10A:
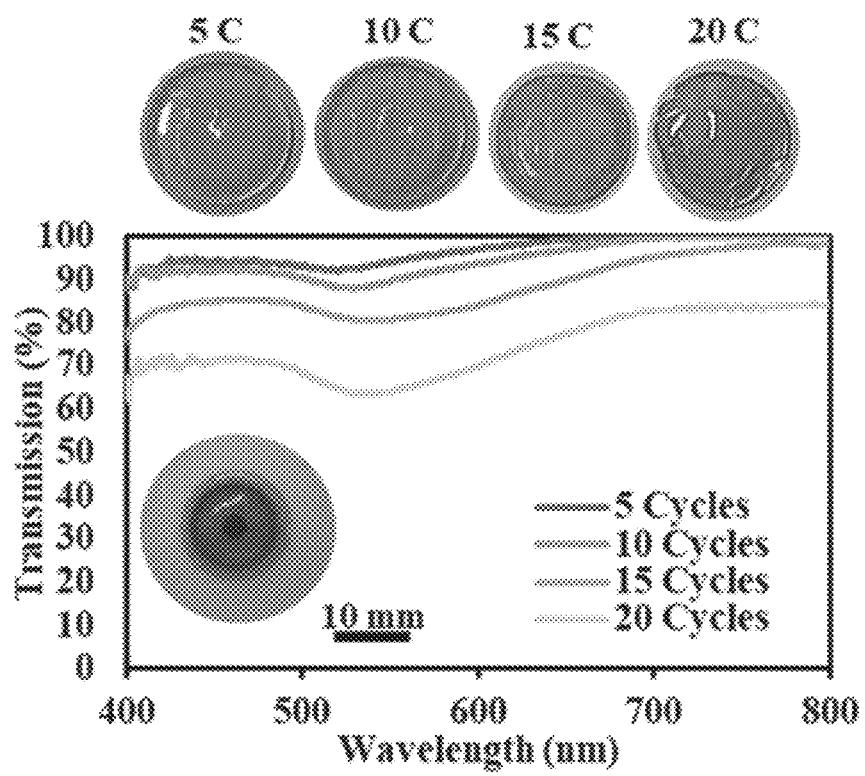
FIG. 10A illustrates transmission spectra of gold NCCLs at different BI-BO cycles with images at each cycle shown, according to some embodiments.
Figure 10B:
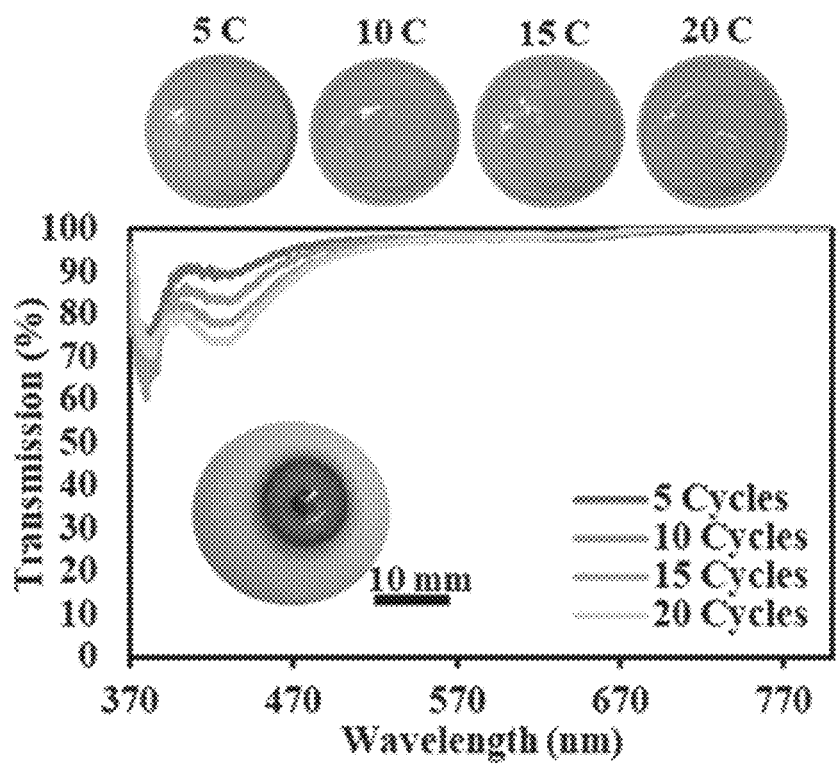
FIG. 10B illustrates transmission spectra of silver NCCLs at different BI-BO cycles with images at each cycle shown, according to some embodiments.

FIG. 10A illustrates transmission spectra of gold NCCLs at different BI-BO cycles with images at each cycle shown. The inset shows the contact lenses, after 20 BI-BO cycles, on an eye model. A line for 10 mm is shown for scale. FIG. 10B illustrates transmission spectra of silver NCCLs at different BI-BO cycles with images at each cycle shown. The inset shows the contact lenses, after 20 BI-BO cycles, on an eye model. A line for 10 mm is shown for scale. Various applications, which utilize nanoparticles for superior physical and chemical properties in contact lenses such as targeted therapy and many optical processes, require variant concentrations of nanoparticles within the lenses. This was demonstrated by altering the number of BI-BO cycles and examining the resulting effect on the optical spectra. Both lenses were homogeneous in color, indicating that nanoparticles did not cluster in one specific area.

For the gold NCCL shown in FIG. 10A, the transmission dip occurred at 532 nm, and over a range of 20 cycles, the transmission at the dip decreased by 36% and the variation in transmission percentage was not consistent throughout the BI-BO cycle incrementation. For the silver NCCL shown in FIG. 10B, the SPR occurred at 433 nm, and up to 28% was blocked at this wavelength. It is worth mentioning that in this test, the reference was an untreated (undoped) contact lens; hence, the transmission dip, initially at 380 nm, was not as clearly visible as the one in FIG. 7D.

Figure 10C:
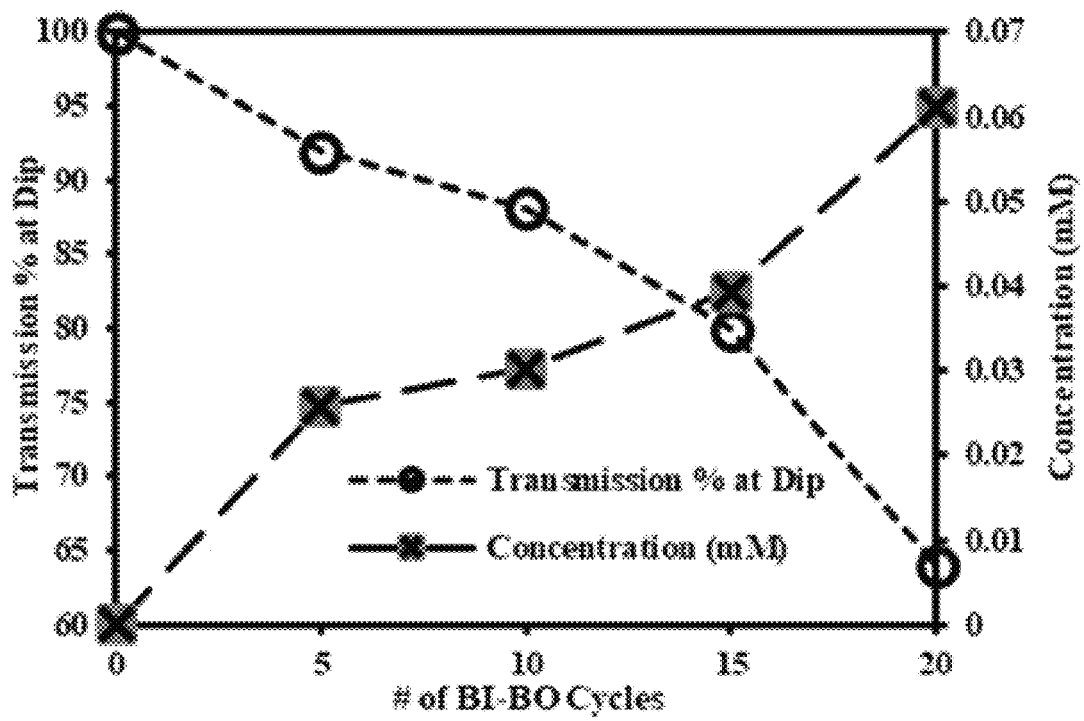
FIG. 10C illustrates the effect of varying the number of BI-BO cycles on the transmission percentage at the dip and the nanoparticle concentration of gold NCCLs, according to some embodiments.
Figure 10D:
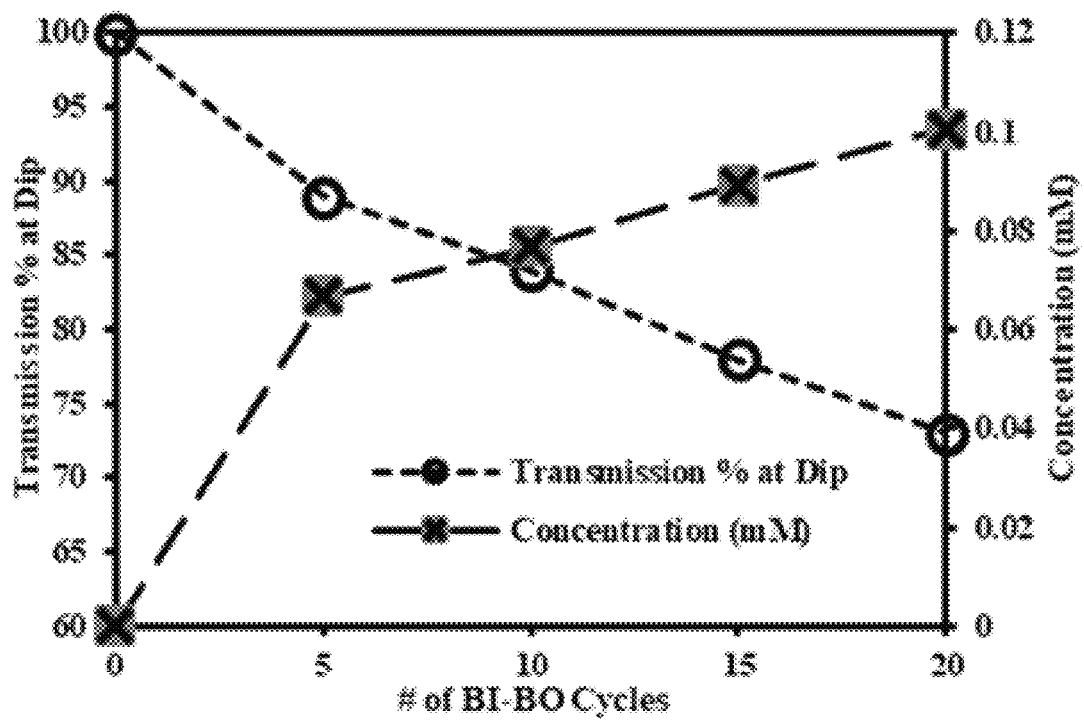
FIG. 10D illustrates the effect of varying the number of BI-BO cycles on the transmission percentage at the dip and the nanoparticle concentration of silver NCCLs, according to some embodiments.

FIG. 10C illustrates the effect of varying the number of BI-BO cycles on the transmission percentage at the dip and the nanoparticle concentration of gold NCCLs. FIG. 10D illustrates the effect of varying the number of BI-BO cycles on the transmission percentage at the dip and the nanoparticle concentration of silver NCCLs. In contrast to the gold NCCL, variations in the BI-BO cycles of the silver NCCL yielded a more constant change in its transmission percentage at the dip. Placing the gel in an aprotic medium (acetone) after it was swollen in an aqueous solvent, containing nanoparticles, will not cause it to expel the newly introduced nanoparticles, as the nanoparticles are bonded with electron-rich nitrogen and oxygen species of the polymeric matrix. Therefore, each breathing-in part of the cycle introduces new nanoparticles into the contact lens; consequently, the concentration of the nanoparticles within the gel is varied. it is the actual BI-BO cycle, which entraps the nanoparticles in the polymeric matrix and not just a simple nanoparticle diffusion.

Additionally, the size of the nanoparticles was important in the successful incorporation into the lenses and formation of the NCCLs. Prior to incorporating the current nanoparticles within the lens through the breathing method, attempts using silver and gold nanoparticles with sizes above 40 nm, in particular, 60, 80, and 100 nm, were made. The transmission spectra remained unchanged even after 30 BI-BO cycles, which indicates that the nanoparticles were not able to penetrate into this particular gel's matrix. The pore size of the polymer's matrix might have an important role in allowing the entrapment of the nanoparticles and aggregates within the matrix. Evidently, largely sized nanoparticles form aggregates, which cannot permeate as smoothly through the gel's matrix as the clusters formed by smaller nanoparticles can; hence, fewer of the largely sized nanoparticles would be entrapped within the gel's matrix as compared to the small sized nanoparticles.

Figure 11:
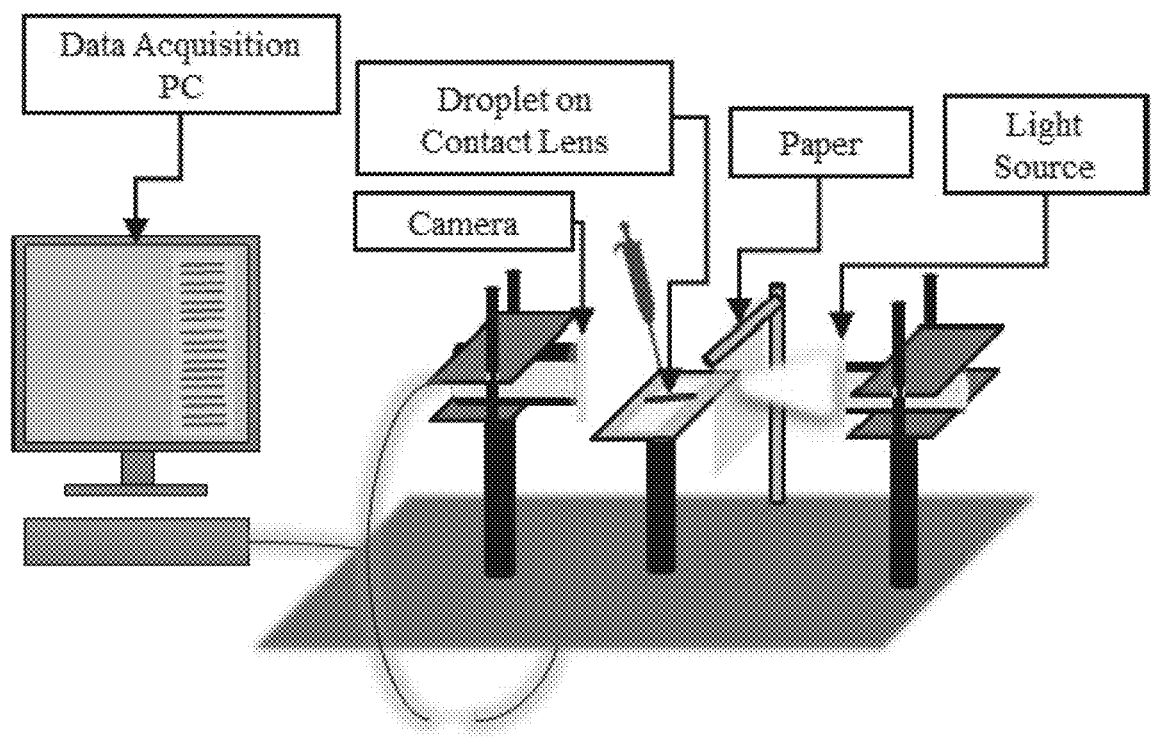
FIG. 11 illustrates an example of a customized contact angle setup, according to some embodiments.
Figure 12A:
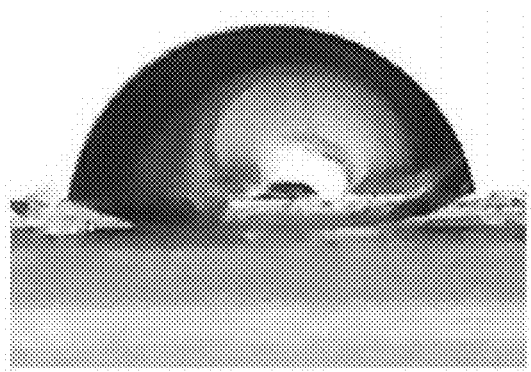
FIG. 12A illustrates an image of a contact angle measurement, according to some embodiments.
Figure 12B:
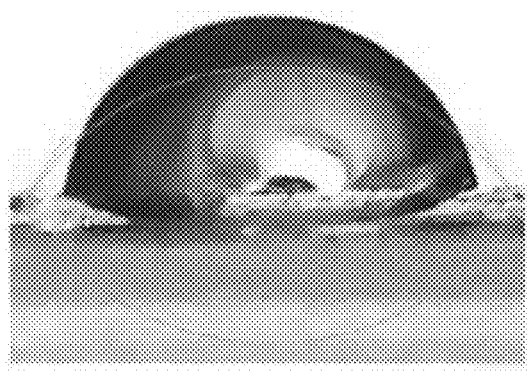
FIG. 12B illustrates an image of a contact angle measurement, according to some embodiments.
Figure 13:
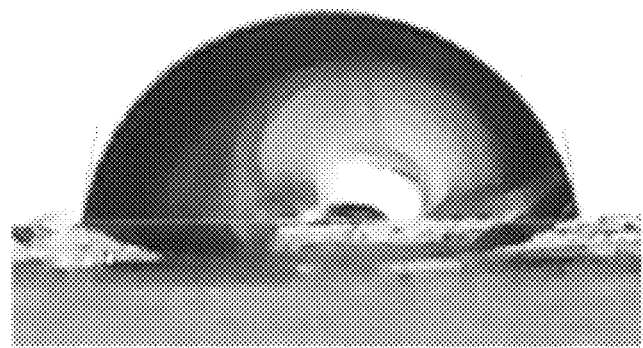
FIG. 13 illustrates drop parameter adjustments until the curve fits the profile of the drop, according to some embodiments.

FIG. 11 illustrates an example of a customized contact angle setup. The wettability and water retention of the contact lenses were evaluated. For the wettability analysis, the static contact angle was measured using a sessile drop method where a stored and hydrated contact lens was placed on a glass slide in the contact angle setup. FIG. 12A and FIG. 12B illustrate an image of a contact angle measurement. 3 and 5 μL of water droplets were placed on the surface of each sample, and five images of the water drops at different spots within the sample were captured. FIG. 13 illustrates drop parameter adjustments until the curve fits the profile of the drop.

To ensure that the BI-BO technique was not detrimental in altering the contact lens material properties, two of the most prominent contact lens properties, the contact angle and the water content, were measured and compared to those of an untreated sample along with a sample that underwent five BI-BO cycles without incorporating nanoparticles. FIG. 14A illustrates an image of the contact angle measurements of an unmodified lens with 3 μL of water drops. FIG. 14B illustrates an image of the contact angle measurements of a gold NCCL with 3 μL of water drops. FIG. 14C illustrates an image of the contact angle measurements of a silver NCCL with 3 μL of water drops. FIG. 14D illustrates an image of the contact angle measurements of a lens that underwent five BI-BO cycles without using nanoparticles with 3 μL of water drops. FIG. 14E illustrates an image of the contact angle measurements of an unmodified lens with 5 μL of water drops. FIG. 14F illustrates an image of the contact angle measurements of a gold NCCL with 5 μL of water drops. FIG. 14G illustrates an image of the contact angle measurements of a silver NCCL with 5 μL of water drops. FIG. 14H illustrates an image of the contact angle measurements of a lens that underwent five BI-BO cycles without using nanoparticles with 5 μL of water drops. Five trials per sample and volume of droplet were recorded and averaged to minimize possible errors.

Figure 14I:
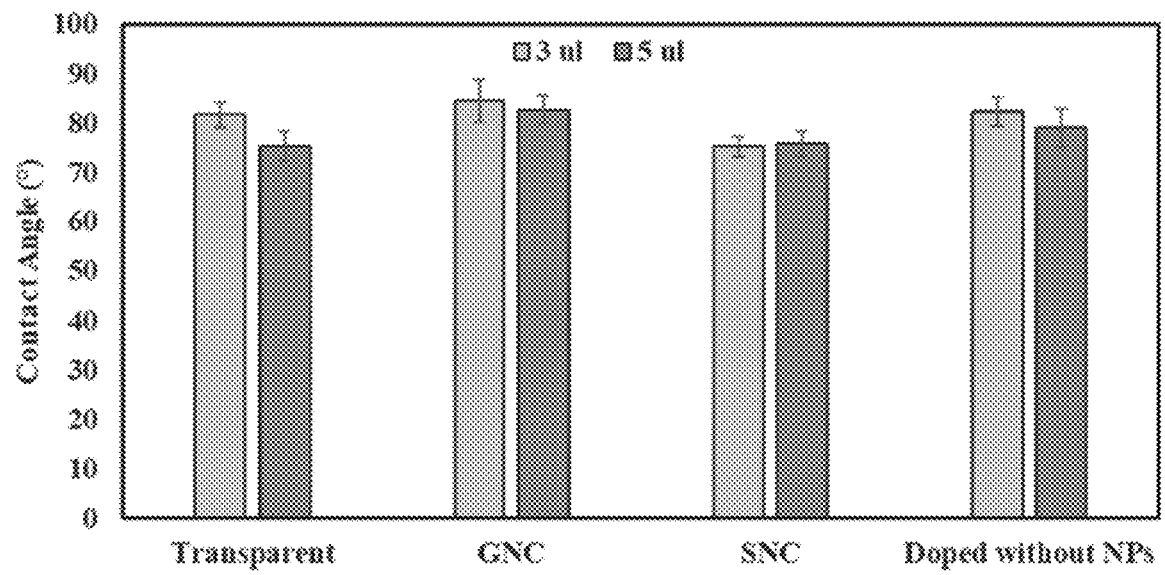
FIG. 14I illustrates a comparison between the contact angle measurements (five per sample) of unmodified lenses, gold NCCLs, silver NCCLs, and lenses that underwent BI-BO cycles without using nanoparticles, according to some embodiments.

FIG. 14I illustrates a comparison between the contact angle measurements (five per sample) of unmodified (transparent) lenses, gold NCCL (GNC), silver NCCL (SNC), and lenses that underwent BI-BO cycles without using nanoparticles. The contact angles of the unaltered, doped without nanoparticles, gold NCCL, and silver NCCL lenses at 3 μL were 81.8°, 82.5°, 84.6°, and 75.3°, respectively, while at 5 μL, the same set of samples had average contact angles of 75.4°, 79.2°, 82.8°, and 75.9°, respectively. Clearly, differences among the four tested samples were very insignificant to suggest any specific trend. The samples were generally hydrophilic; however, the contact angles were higher than the average contact angle of HEMA hydrogels, which is in the range of 60-70°. Copolymerization of HEMA and wetting agents like PVP with hydrophobic silicone-based hydrogels could have caused this decrease in surface wettability. Further, standard deviations were all less than 5%, which indicates that the measurements were close to each other with minimal errors. Also, no noticeable differences were observed when increasing the droplet volume from 3 to 5 μL. Therefore, the incorporation of the nanoparticles into the contact lenses through the BI-BO method did not alter the inherent surface chemistry and wettability of the samples.

Figure 14J:
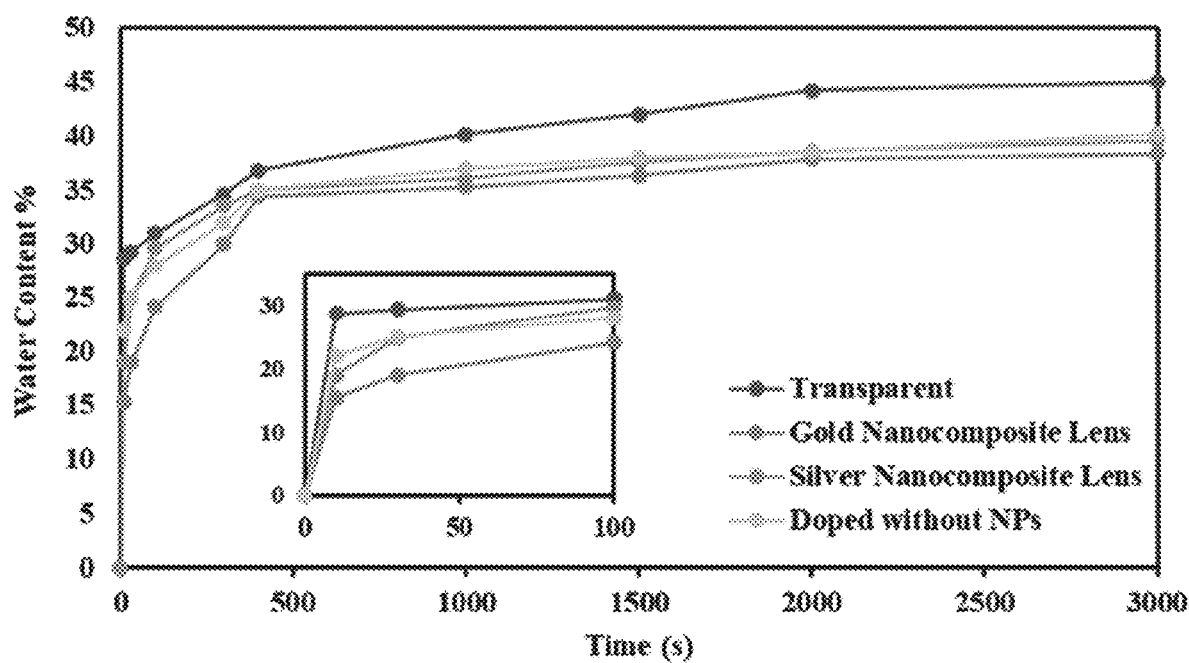
FIG. 14J illustrates water retention of NCCLs compared to unmodified lenses at multiple time intervals, according to some embodiments.

FIG. 14J illustrates water retention of NCCLs compared to unmodified lenses at multiple time intervals. Water retention values of the NCCLs were compared to those of the transparent (untreated) lens and the lens treated through five BI-BO cycles without nanoparticles at multiple time intervals, to assess the steady state value of water retention and the transient response during water absorption. The final water content values of the transparent, doped without nanoparticles, gold, and silver contact lenses were 45.0, 40.2, 38.4, and 39.6%, respectively. The water retention of the untreated lens was similar to the 46% value reported by Johnson & Johnson for 1-Day Acuvue TruEye contact lens. Differences between the water contents of both NCCLs were about 1%; however, the water retention of both nanocomposites was less than that of the untreated contact lens by approximately 5-6%. The diminishing water absorption capacity of the nanocomposites compared to the transparent lens was also noted in the transient water uptake stage. The inset of FIG. 14J indicates that the initial water uptake of the NCCLs was at least 10% less than that of untreated lens. However, the behavior of the two NCCLs in retaining water was similar. A possible explanation to this reduction in the water content of the NCCLs is the fact that additional crosslinks may have formed during the breathing-in part of the cycle; these crosslinks would have been between the electron-rich particles of polymeric chains' functional segments and the gold/silver nanoparticles. The latter could have partially filled up the spaces between the polymeric chains, reduced the effective pore size of the matrix, and diminished the lens' ability to retain water effectively. Nonetheless, this reduction was not very detrimental, and both the water content and contact angle properties of the NCCLs were within the acceptable range of commercial contact lens products.

Figure 15A:
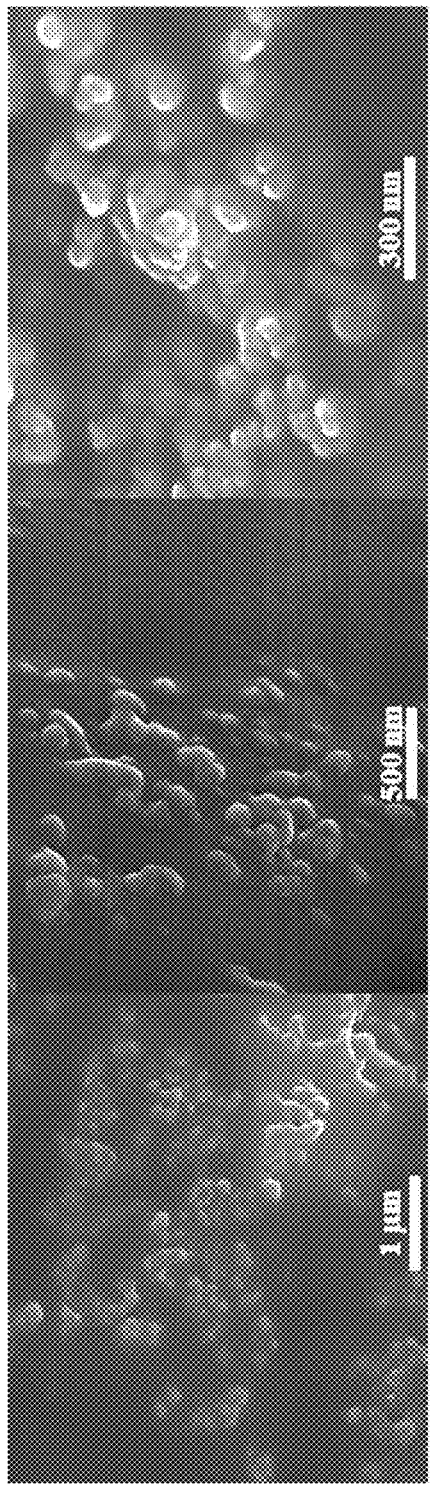
FIG. 15A illustrates SEM (scanning electron microscope) micrographs of a gold NCCL cross-section at different magnifications, according to some embodiments.
Figure 15B:
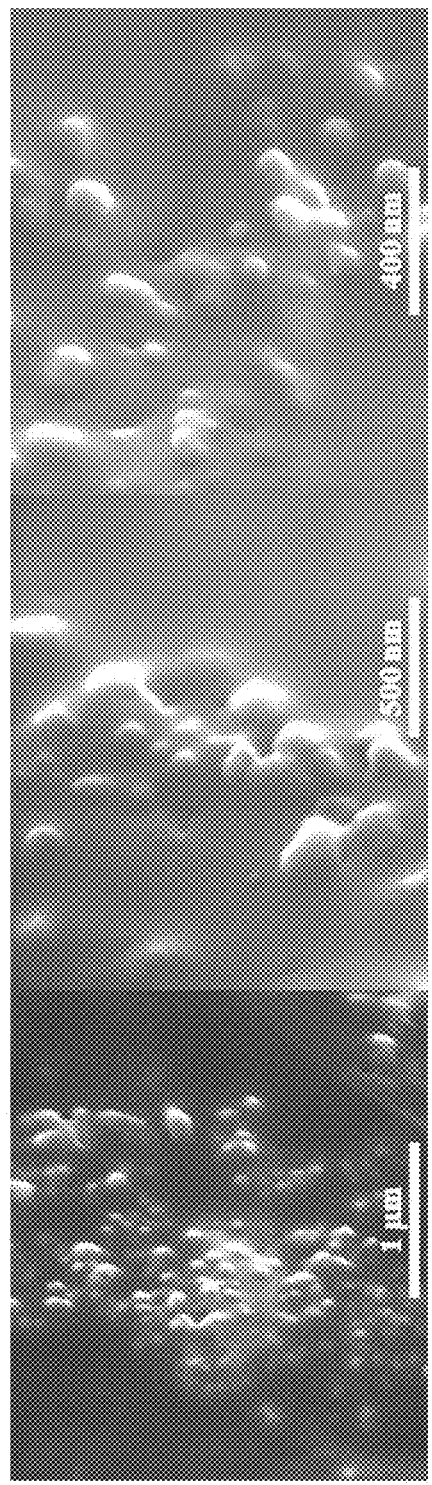
FIG. 15B illustrates SEM micrographs of a silver NCCL cross-section at different magnifications, according to some embodiments.

FIG. 15A illustrates SEM micrographs of a gold NCCL cross-section at different magnifications. FIG. 15B illustrates SEM micrographs of a silver NCCL cross-section at different magnifications. Evidently, nanoparticles in both samples were highly aggregated with clear formation of clusters. This was expected as introduction of the nanoparticles into the polymer matrix was not well-ordered. This can also be inferred from FIG. 10C and FIG. 10D which shows that the addition of the nanoparticles into the contact lens through the BI-BO method did not have a consistent change in the lens' optical properties. Hence, it is no surprise that the nanoparticles were agglomerated, and the latter was noticed in all samples regardless of the BI-BO cycles they have undergone. Nonetheless, the nanoparticles were not all clustered in a specific region within the lens as this would have been evident through the microscopic images, which showed a thorough homogeneous color and no obvious dark spots as shown in FIG. 7E and FIG. 7F. This method, in itself, did not cause the nanoparticle aggregation within the lens.

Figure 16A:
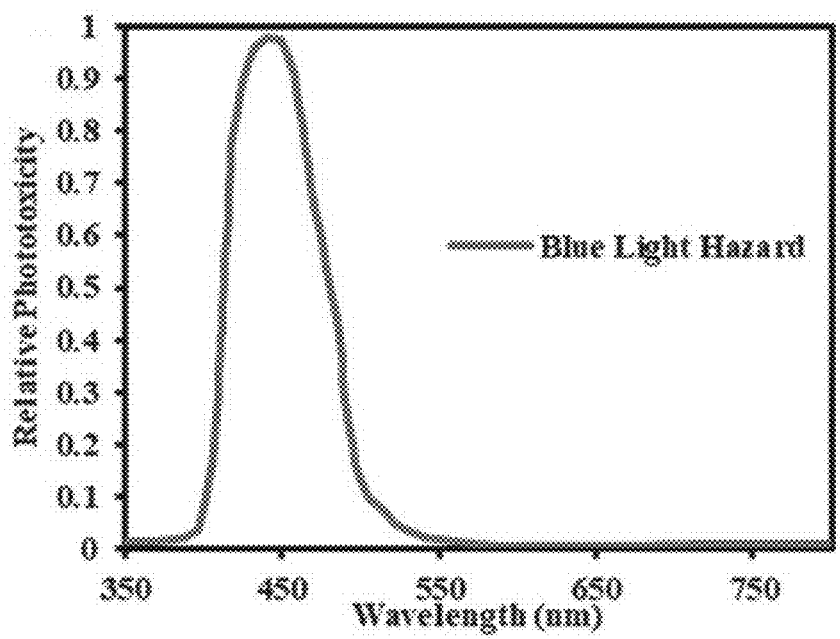
FIG. 16A illustrates a retinal phototoxicity spectrum of hazardous blue light, having a peak at 440 nm, according to some embodiments.
Figure 16B:
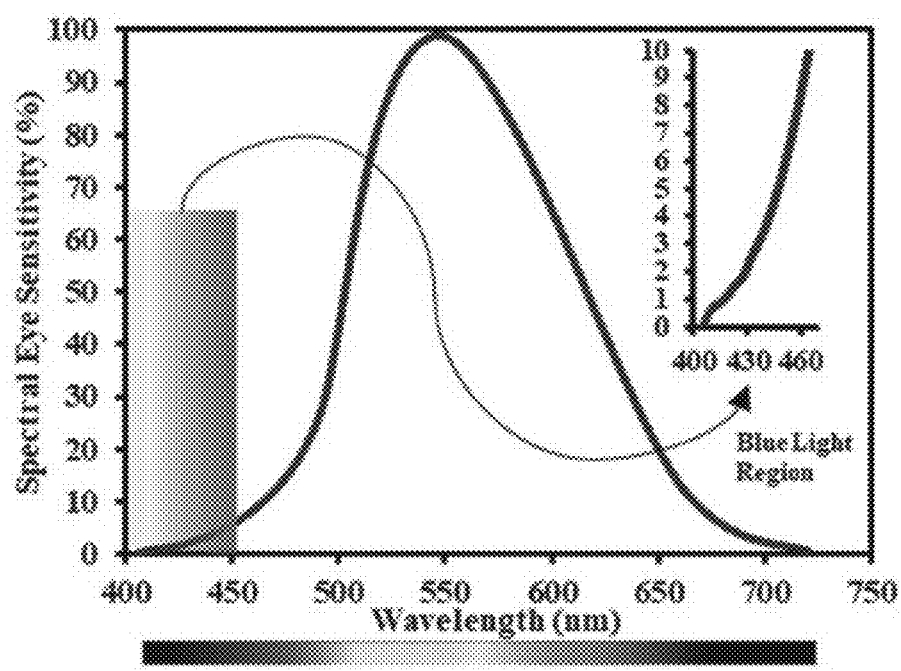
FIG. 16B illustrates sensitivity of the eye in the visible light range, according to some embodiments.

After characterizing the NCCLs through optical and material tests, the suitability for biomedical and optical applications was assessed by evaluating the efficacy as color filtering wearables and, in particular, as potential blue light filtering lenses. FIG. 16A illustrates a retinal phototoxicity spectrum of hazardous blue light, having a peak at 440 nm. FIG. 16B illustrates sensitivity of the eye in the visible light range. The inset shows the blue light portion. Recently, detrimental effects of blue light are increasingly being acknowledged, and thus, more light is being shed on the connection between blue light and eye comfort issues and also on techniques that may combat shortcomings arising from the latter. Further, studies have shown that blue light, which has the highest energy in the visible light range, is one of the prominent causes of retinal phototoxicity, and several animal-based experiments have demonstrated the dangers of long-term exposure to blue light. Melatonin suppression has also been associated with extensive exposure (more than 2 hours) to blue light in the evenings. Maximal melatonin suppression was recorded at a light wavelength of 424 nm. It is also worth noting that not all blue light is harmful as studies have shown that blue light with wavelength ranges of 470-500 nm is crucial for maintaining the normal functionality of several visual functions. It is reported that high-energy blue light, which causes maximum retinal damage, has a wavelength of 415-455 nm. A good portion of UV radiation is blocked by the cornea, crystalline lens, and other ocular structures; however, the retina is generally exposed to high-energy blue light (400-450 nm), which necessitates the development of blue light filtering wearables.

Figure 16C:
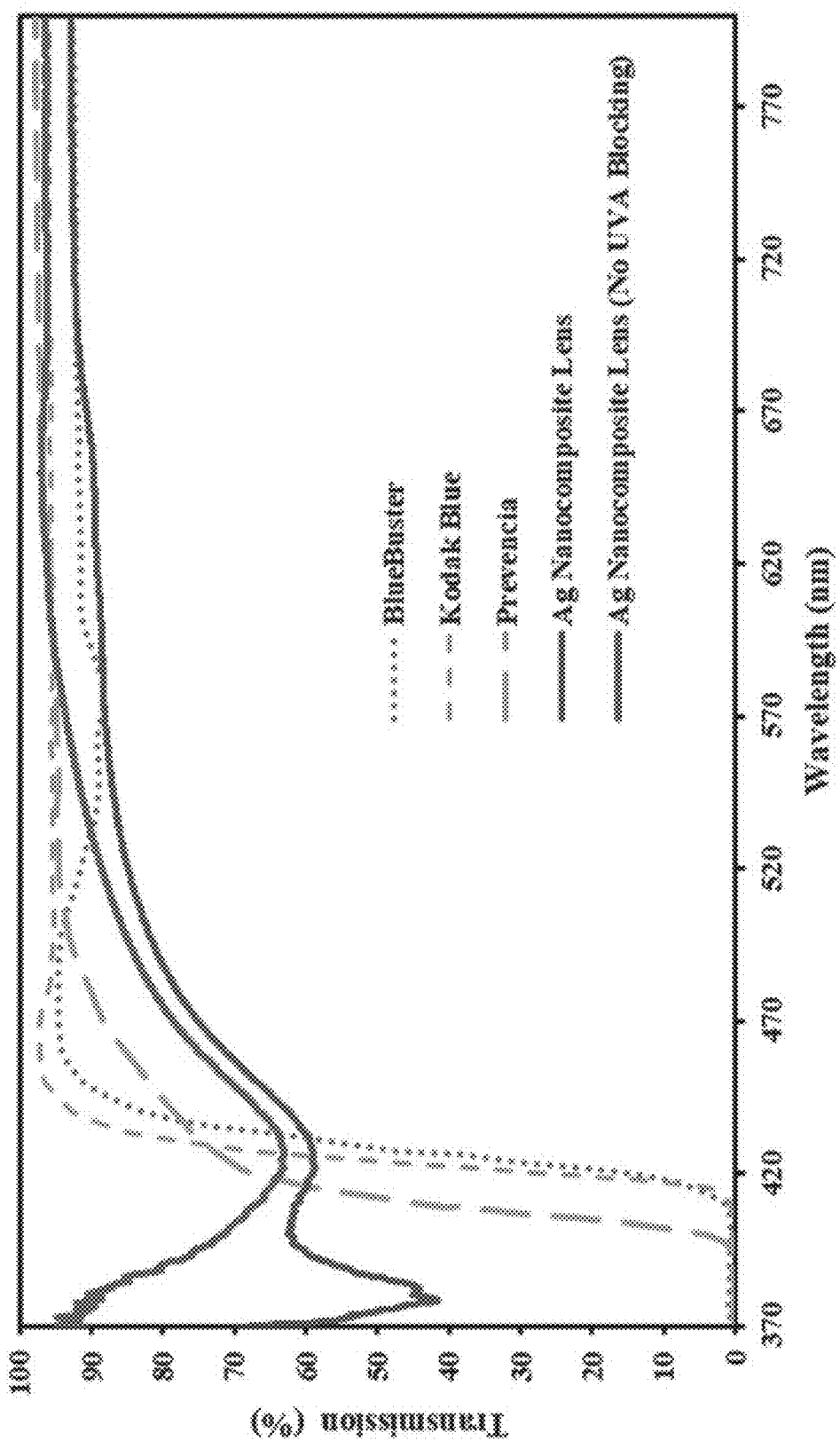
FIG. 16C illustrates transmission spectra of developed silver NCCLs in comparison to the spectra of commercial blue light filtering glasses, according to some embodiments.

FIG. 16C illustrates transmission spectra of developed silver NCCLs in comparison to the spectra of commercial blue light filtering glasses. The spectra of the silver NCCLs (with and without UVA filter), Kodak Blue, BlueBuster, and Prevencia are shown. It can be observed that Kodak Blue and BlueBuster block 100% of the light up to 410 nm; both glasses gradually transmit more light, thus reducing the filtering capabilities, from 410 to 450 nm, which is within the high-energy blue light region. The latter indicates excellent filtering for the UV portion but not the blue light region. As for Prevencia glasses, these glasses block 100% of the light up to 400 nm, after which its transmission steeply increases to 65% at 420 nm. However, unlike the former two glasses, Prevencia glasses have better filtering properties in the high-energy blue light region, as it steadily blocks an average of 25% of the incoming light from 420-460 nm. Nonetheless, the spectra of the contact lenses were clearly more selective than those of the glasses. The spectra of the silver NCCL without UVA blocking were obtained by using a transparent (untreated) lens as a reference. Light blockage from the silver NCCL at the high-energy blue light, 400 nm-450 nm, was almost constant at 41%, whereas the silver NCCL without the UV-blocking feature transmitted 65%-72% of light at the same range of wavelengths. Both silver NCCLs allowed more than 80% of the incoming light beyond 470 nm.

Figure 17:
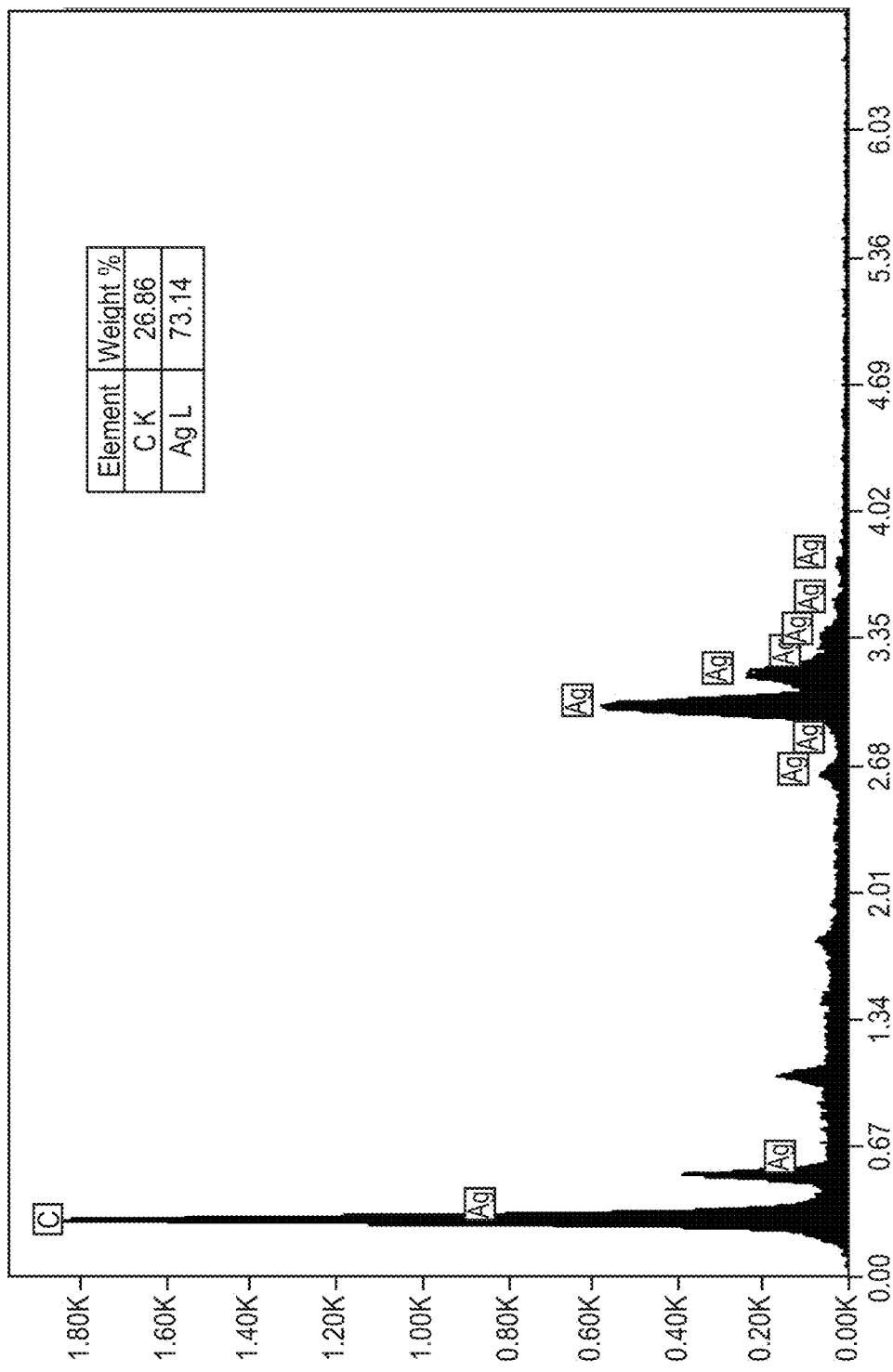
FIG. 17 illustrates EDX characterization of silver nanoparticles placed on a carbon tape, according to some embodiments.
Figure 18:
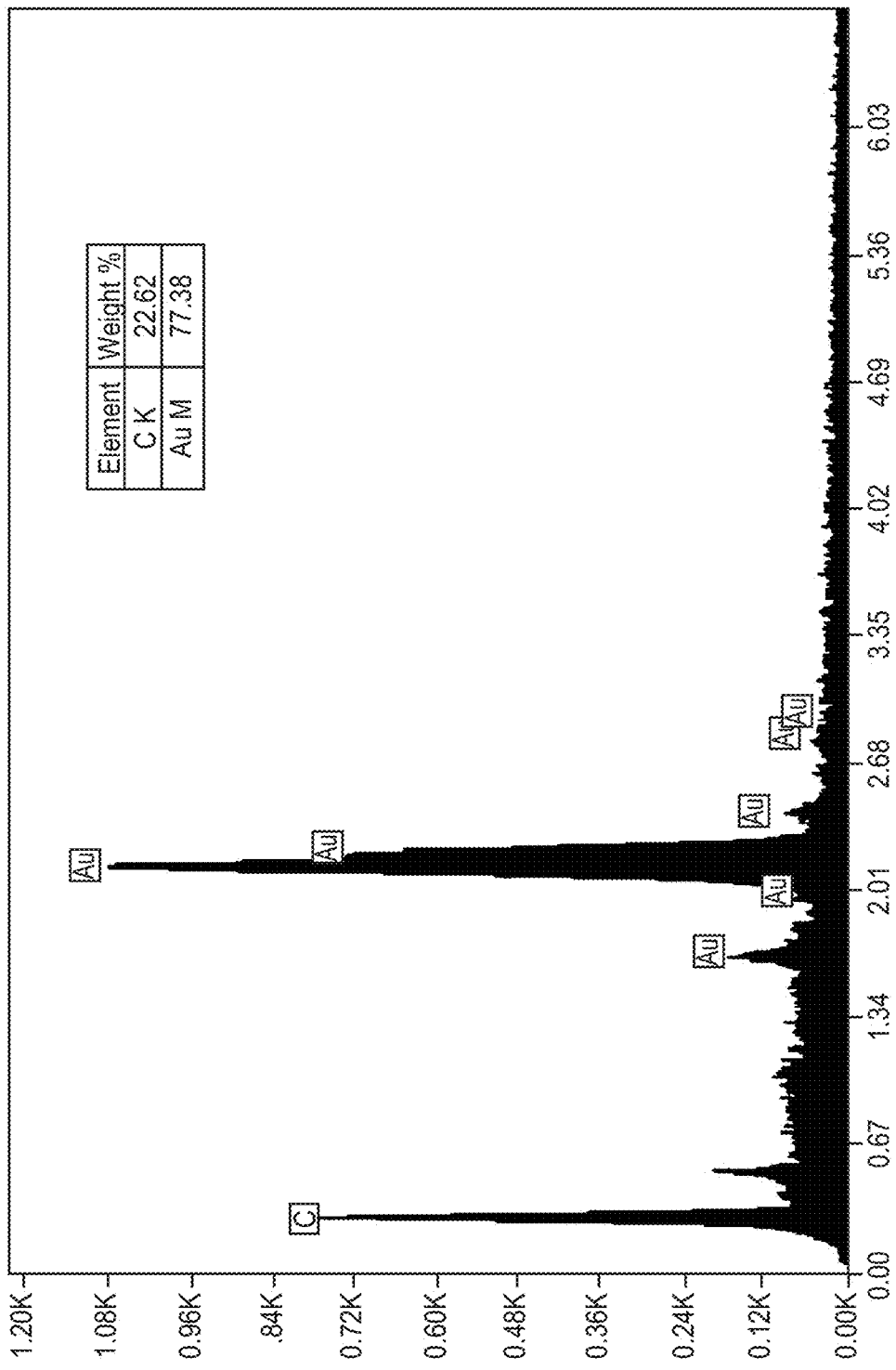
FIG. 18 illustrates EDX characterization of gold nanoparticles placed on a carbon tape, according to some embodiments.

FIG. 17 illustrates EDX characterization of silver nanoparticles placed on a carbon tape and analyzed through SEM. The inset table shows the weight percentage of each individual chemical element. As shown, silver is shown with a weight percentage of 73.14%. FIG. 18 illustrates EDX characterization of gold nanoparticles placed on a carbon tape and analyzed through SEM. The inset table shows the weight percentage of each individual chemical element. As shown, gold is shown with a weight percentage of 77.38%.

Figure 19A:
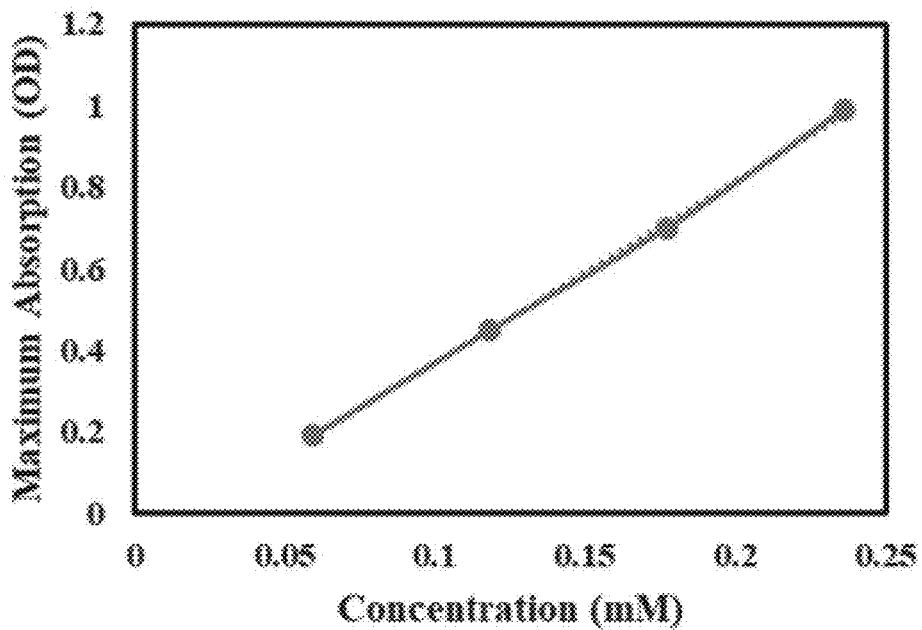
FIG. 19A illustrates a calibration curve for 20 nm gold nanoparticles used to determine the concentration of the nanoparticles through the measured peak absorption value, according to some embodiments.
Figure 19B:
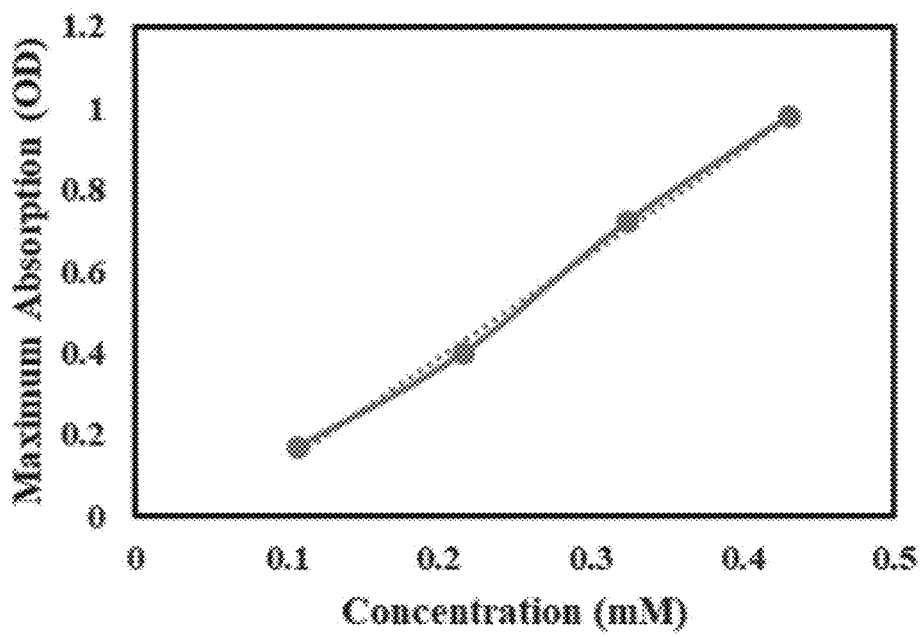
FIG. 19B illustrates a calibration curve for 40 nm silver nanoparticles used to determine the concentration of the nanoparticles through the measured peak absorption value, according to some embodiments.

FIG. 19A illustrates a calibration curve for 20 nm gold nanoparticles used to determine the concentration of the nanoparticles through the measured peak absorption value. The $R^2$ value is 0.9989. FIG. 19B illustrates a calibration curve for 40 nm silver nanoparticles used to determine the concentration of the nanoparticles through the measured peak absorption value. The $R^2$ value is 0.9963.

Figure 20A:
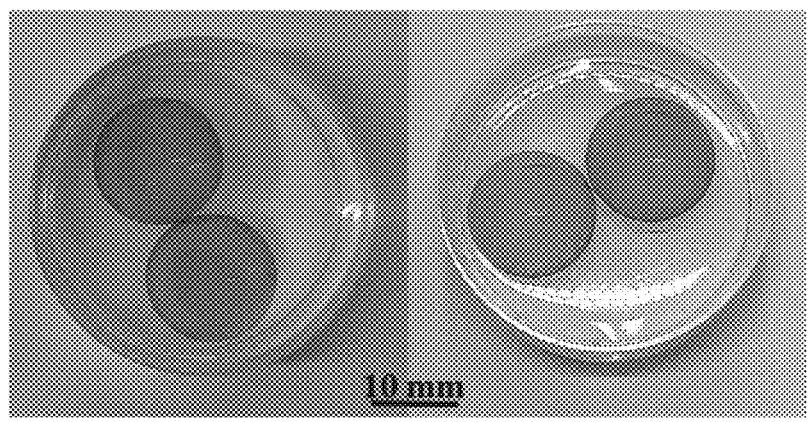
FIG. 20A illustrates images of gold NCCLs in tear fluid solution after BI-BO cycles, according to some embodiments.
Figure 20B:
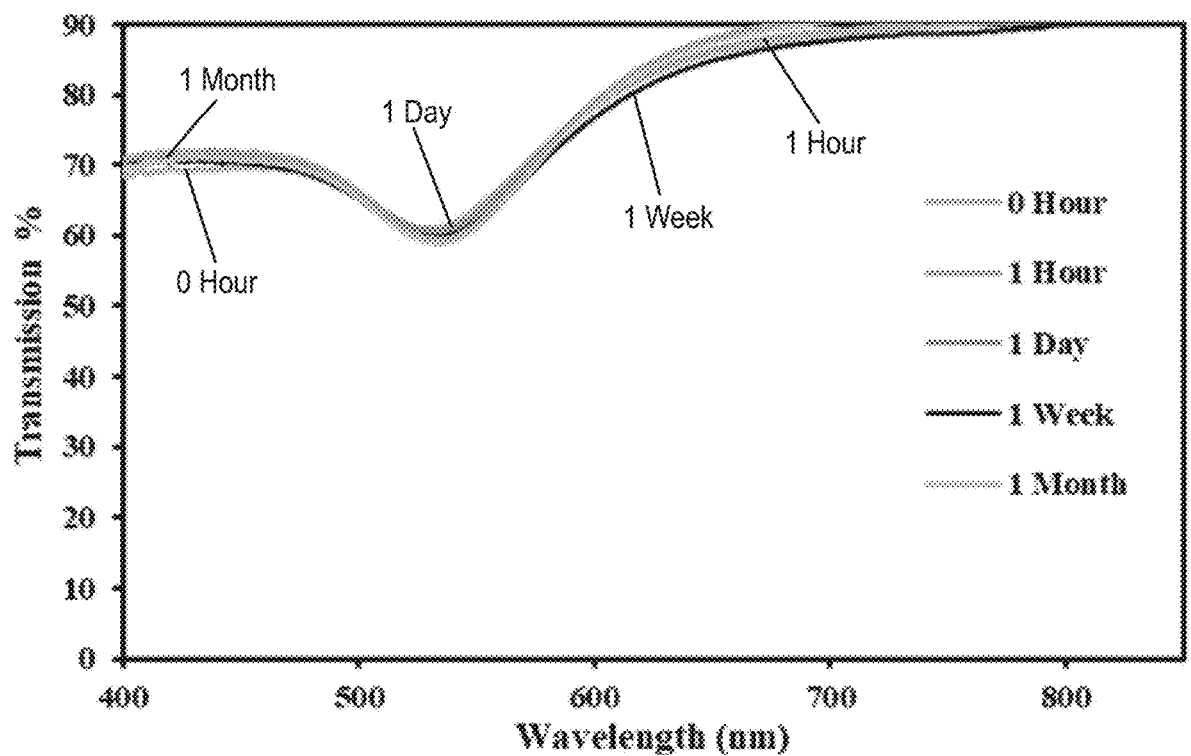
FIG. 20B illustrates transmission spectra of lenses undergoing 20 cycles over a one-month period while being placed in tear fluid solution, according to some embodiments.
Figure 20C:
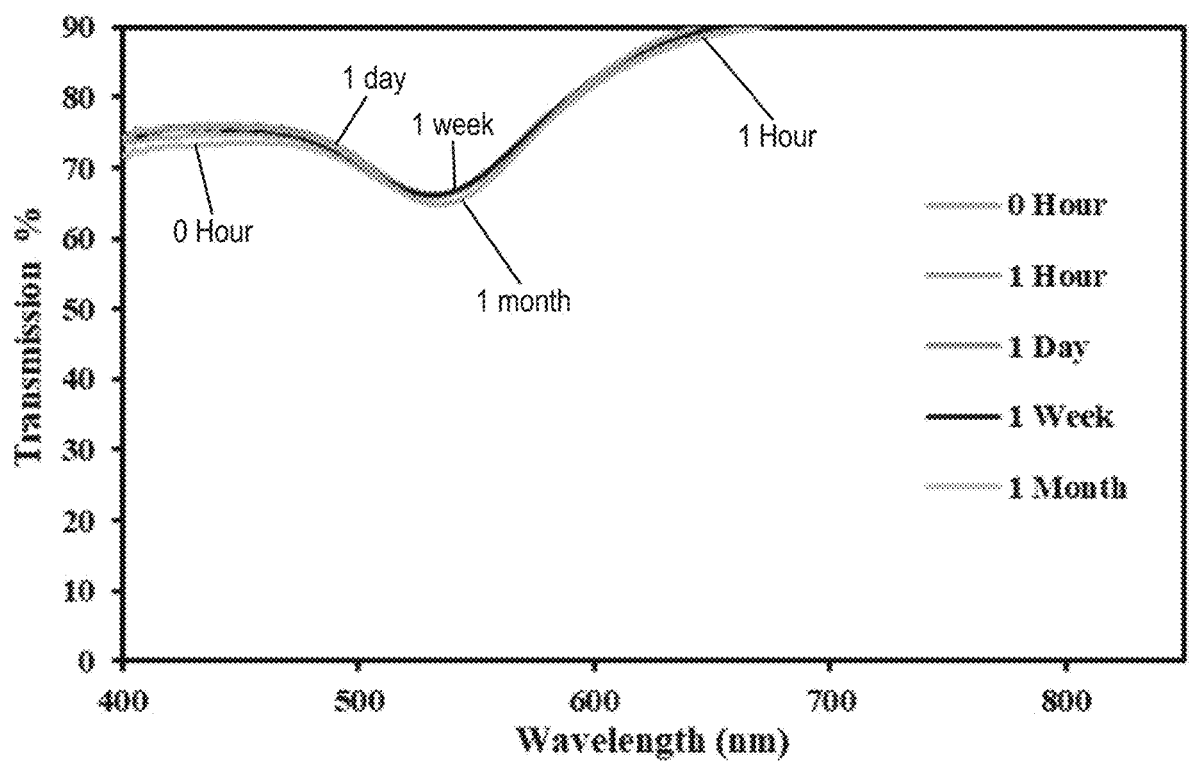
FIG. 20C illustrates transmission spectra of lenses undergoing 18 cycles over a one-month period while being placed in tear fluid solution, according to some embodiments.

FIG. 20A illustrates images of gold NCCL in tear fluid solution after BI-BO cycles. For scale, a line is shown for 10 mm. These lenses have gold nanoparticles incorporated into the lenses. FIG. 20B illustrates transmission spectra of lenses undergoing 20 cycles over a one-month period while being placed in tear fluid solution. FIG. 20C illustrates transmission spectra of lenses undergoing 18 cycles over a one-month period while being placed in tear fluid solution. As displayed in FIG. 20B and FIG. 20C, the transmission spectra of the lenses remained very similar even after one-month. This shows that minimal leaching occurred.

The optical properties of the silver NCCLs were more selective compared to those of commercial wearables, and because the material properties, specifically wettability and water content, are within acceptable ranges compared to other commercial contact lenses, these fabricated NCCLs are well-suited for deployment in this vital application. Utilizing the silver NCCL for blue light filtering is only one of the potential applications of these developed nanocomposites, as they could also be used as antibacterial contact lenses. The developed contact lenses, which incorporate these nanoparticles, have the potential to combat microbes and bacteria that might adhere to the contact lens. The BI-BO method does not diminish the antibacterial behavior of the silver nanoparticles. Moreover, since the peak absorption properties are within the range of filtered wavelengths required to facilitate enhanced color distinction for colorblind patients (540-570 nm), the gold NCCLs could be exploited as possible colorblind lenses. The gold NCCLs, synthesized through the BI-BO method, would probably yield similar if not better properties, as the base contact lens material, herein, is of commercial standard and was not in situ fabricated. Large nanoparticles may be utilized (>40 nm) to filter the desired wavelength range and avoid excessive aggregation.

While the disclosure has been described with reference to an exemplary embodiment(s), it will be understood by those skilled in the art that various changes may be made, and equivalents may be substituted for elements thereof without departing from the scope of the embodiment(s). In addition, many modifications may be made to adapt a particular situation or material to the teachings of the embodiment(s) without departing from the essential scope thereof. Therefore, it is intended that the disclosure is not limited to the disclosed embodiment(s), but that the disclosure will include all embodiments falling within the scope of the appended claims. Various examples have been described. These and other examples are within the scope of the following claims.

What is claimed is:

1. A method of incorporating nanoparticles into a contact lens, the method comprising:
   contacting a contact lens with a solvent sufficient to remove liquid from the contact lens; and
   contacting the contact lens with colloidal nanoparticles sufficient to transfer nanoparticles from the colloidal nanoparticles to the contact lens,
   wherein the contact lens includes one or more materials selected from the group consisting of narafilcon A, senofilcon A, etafilcon A, delefilcon A, senofilcon C, comfilcon A, fanfilcon A, ocufilcon D, omafilcon B, somofilcon A, stenfilcon A, hydroxyethyl methacrylate, ethylene glycol dimethylacrylate, polyvinyl pyrrolidone, and a siloxane monomer,
   and wherein the diameter of the nanoparticles ranges from 5 nm to 45 nm.

2. The method of claim 1, wherein the solvent includes one or more of acetone, tetrahydrofuran (THF), ethyl acetate (EA), acetonitrile (MeCN), dimethylformamide (DMF), dimethyl sulfoxide (DMSO), and hexamethylphosphoric triamide (HMPA).

3. The method of claim 1, wherein the step of contacting the contact lens with the solvent occurs for about two minutes to about ten minutes.

4. The method of claim 1, wherein the colloidal nanoparticles include water.

5. The method of claim 1, wherein the nanoparticles include one or more of gold nanoparticles and silver nanoparticles.

6. The method of claim 1, wherein the nanoparticles have permeated through pores of the contact lens.

7. The method of claim 1, wherein the step of contacting the contact lens with colloidal nanoparticles occurs for about two minutes to about ten minutes.

8. A method of incorporating nanoparticles into a contact lens, the method comprising:
   performing at least two cycles including:
      contacting a contact lens with an aprotic solvent sufficient to remove liquid from the contact lens; and
      contacting the contact lens with colloidal nanoparticles sufficient to transfer nanoparticles into pores of the contact lens;
   washing the contact lens with liquid to remove unabsorbed surface nanoparticles,
   wherein the contact lens includes one or more materials selected from the group consisting of narafilcon A, senofilcon A, etafilcon A, delefilcon A, senofilcon C, comfilcon A, fanfilcon A, ocufilcon D, omafilcon B, somofilcon A, stenfilcon A, hydroxyethyl methacrylate, ethylene glycol dimethylacrylate, polyvinyl pyrrolidone, and a siloxane monomer,
   and wherein the diameter of the nanoparticles ranges from 5 nm to 45 nm.

9. The method of claim 8, wherein the colloidal nanoparticles include one or more of gold nanoparticles and silver nanoparticles.

10. The method of claim 8, wherein the aprotic solvent includes one or more of acetone, tetrahydrofuran (THF), ethyl acetate (EA), acetonitrile (MeCN), dimethylformamide (DMF), dimethyl sulfoxide (DMSO), and hexamethylphosphoric triamide (HMPA).

11. The method of claim 8, wherein the colloidal nanoparticles are silver nanoparticles and are sufficient to block over 25% of the light in the 400 nm to 450 nm range.

12. The method of claim 8, wherein the colloidal nanoparticles are gold nanoparticles and are sufficient to provide enhanced color distinction in the 540 nm to 570 nm range.

13. A light filtering contact lens, the contact lens comprising:
- a hydrogel layer including inner pores and an outer surface; and
- metal nanoparticles,
- wherein the metal nanoparticles are dispersed within the inner pores of the hydrogel layer, the outer surface is substantially nanoparticle-free, and the contact lens blocks over 25% of light ranging from 400 nm to 450 nm,
- wherein the hydrogel layer includes one or more materials selected from the group consisting of narafilcon A, senofilcon A, etafilcon A, delefilcon A, senofilcon C, comfilcon A, fanfilcon A, ocufilcon D, omafilcon B, somofilcon A, stenfilcon A, hydroxyethyl methacrylate, ethylene glycol dimethylacrylate, polyvinyl pyrrolidone, and a siloxane monomer,
- and wherein the diameter of the metal nanoparticles ranges from 5 nm to 45 nm.

14. The light filtering contact lens of claim 13, wherein the metal nanoparticles include silver nanoparticles.

15. The light filtering contact lens of claim 13, wherein the metal nanoparticles are sufficient to transmit over 75% of light at wavelengths greater than 470 nm.

* * * * *